US011554826B2

(12) United States Patent
Inose et al.

(10) Patent No.: US 11,554,826 B2
(45) Date of Patent: Jan. 17, 2023

(54) STORAGE BOX POWER SUPPLY STRUCTURE FOR SADDLED VEHICLE

(71) Applicant: HONDA MOTOR CO., LTD., Tokyo (JP)

(72) Inventors: Koji Inose, Wako (JP); Eijiro Asakawa, Wako (JP); Yoshiyuki Horii, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 310 days.

(21) Appl. No.: 16/763,562

(22) PCT Filed: Dec. 27, 2018

(86) PCT No.: PCT/JP2018/048337
§ 371 (c)(1),
(2) Date: May 13, 2020

(87) PCT Pub. No.: WO2019/131951
PCT Pub. Date: Jul. 4, 2019

(65) Prior Publication Data
US 2020/0339208 A1  Oct. 29, 2020

(30) Foreign Application Priority Data
Dec. 28, 2017  (JP) .............................. JP2017-254999

(51) Int. Cl.
*B62J 9/24*  (2020.01)
*B62J 9/23*  (2020.01)
(Continued)

(52) U.S. Cl.
CPC . *B62J 9/24* (2020.02); *B62J 6/04* (2013.01); *B62J 9/23* (2020.02); *B62J 9/27* (2020.02);
(Continued)

(58) Field of Classification Search
CPC ......... B62J 9/24; B62J 6/04; B62J 9/23; B62J 9/27; B62J 11/19; B62J 45/00; B62J 43/30
See application file for complete search history.

(56) References Cited

U.S. PATENT DOCUMENTS

2006/0162978 A1* 7/2006 Thompson ................. B62J 9/23
180/219
2012/0187167 A1* 7/2012 Salisbury ............... B62K 11/00
29/426.1
(Continued)

FOREIGN PATENT DOCUMENTS

CN  201343090  11/2009
EP  0882644  12/1998
(Continued)

OTHER PUBLICATIONS

Extended European Search Report for European Patent Application No. 18897452.1 dated Nov. 3, 2020.
(Continued)

*Primary Examiner* — Jacob D Knutson
*Assistant Examiner* — Marlon A Arce
(74) *Attorney, Agent, or Firm* — Amin, Turocy & Watson, LLP

(57) ABSTRACT

A storage box power supply structure for a saddled vehicle includes a storage box (30), a carrier (50) configured to detachably mount the storage box (30) on a vehicle body, a hook (33) configured to connect the storage box (30) to the carrier (50), a hook receiving section (53) configured to receive the hook (33), a hook-side terminal (70) provided inside the hook (33) and configured to supply electric power to an electrical component (46), and a receiving-side terminal (80) provided in the hook receiving section (53) and
(Continued)

connected to the hook-side terminal (70) when the storage box (30) is mounted on the carrier (50).

11 Claims, 22 Drawing Sheets

(51) Int. Cl.
    *B62J 9/27*     (2020.01)
    *B62J 45/00*    (2020.01)
    *B62J 6/04*     (2020.01)
    *B62J 11/19*    (2020.01)
    *B62J 43/30*    (2020.01)
(52) U.S. Cl.
    CPC ............... *B62J 11/19* (2020.02); *B62J 45/00* (2020.02); *B62J 43/30* (2020.02)

(56) References Cited

U.S. PATENT DOCUMENTS

| | | | |
|---|---|---|---|
| 2013/0216883 | A1 | 8/2013 | Kawatani et al. |
| 2013/0240584 | A1 | 9/2013 | Nagayoshi et al. |
| 2014/0042200 | A1* | 2/2014 | Namani ..................... B62J 9/23 |
| | | | 361/679.01 |
| 2016/0023704 | A1 | 1/2016 | Kitayama et al. |
| 2017/0341693 | A1* | 11/2017 | Rzepecki .................. B62J 1/28 |
| 2019/0192363 | A1* | 6/2019 | Mower ..................... A61G 5/04 |

FOREIGN PATENT DOCUMENTS

| | | |
|---|---|---|
| EP | 0987172 | 3/2000 |
| EP | 1078848 | 2/2001 |
| EP | 2586687 | 5/2013 |
| GB | 1089330 | 11/1967 |
| JP | 2013-169862 | 9/2013 |
| JP | 2013-189116 | 9/2013 |
| JP | 2016-028920 | 3/2016 |
| JP | 2016-068766 | 5/2016 |
| KR | 200460263 | 5/2012 |
| WO | 2011/000398 | 1/2011 |

OTHER PUBLICATIONS

International Search Report and Written Opinion for International Application No. PCT/JP2018/048337 dated Mar. 12, 2019, 9 pages.

* cited by examiner

STORAGE BOX POWER SUPPLY STRUCTURE FOR SADDLED VEHICLE

TECHNICAL FIELD

The present invention relates to a storage box power supply structure for a saddled vehicle.

Priority is claimed on Japanese Patent Application No. 2017-254999, filed Dec. 28, 2017, the content of which is incorporated herein by reference.

BACKGROUND ART

In the related art, a storage box power supply structure for a saddled vehicle including a storage box having electrical components therein and a carrier configured to detachably mount the storage box on a vehicle body is disclosed (for example, see Patent Document 1). Since the storage box is attached to the carrier, a carrier-side connector and a storage box-side connector are connected, and electric power can be supplied to the electrical component from a battery of a vehicle.

RELATED ART DOCUMENT

Patent Document

Patent Document 1: Japanese Unexamined Patent Application, First Publication No. 2016-68766

SUMMARY

Problems to Be Solved By the Invention

However, in Patent Document 1, in order to provide a power supply structure, a new power supply part (a box-side connector) is provided on a bottom section (a box-side facing section facing a carrier-side facing section) of a storage box, and it is necessary to greatly change shapes of the storage box and a carrier. In addition, vibrations are expected to enter a contact portion (hereinafter, referred to as "a contact section") between a terminal on the side of the storage box and a terminal on the side of the carrier.

An aspect of the present invention is directed to providing a storage box power supply structure for a saddled vehicle in which a power supply part is provided in an area having high resistance to vibrations and high rigidity as a power supply structure using a conventional structure while a novel power supply part is not provided in a storage box.

Means for Solving the Problem

An aspect of the present invention has the following configurations.

(1) A storage box power supply structure for a saddled vehicle according to an aspect of the present invention includes a storage box (30); a carrier (50) configured to detachably mount the storage box (30) on a vehicle body; a hook (33); configured to connect the storage box (30) to the carrier (50); a hook receiving section (53) configured to receive the hook (33); a hook-side terminal (70) provided inside the hook (33) and configured to supply electric power to an electrical component (46); and a receiving-side terminal (80) provided in the hook receiving section (53) and connected to the hook-side terminal (70) when the storage box (30) is mounted on the carrier (50).

(2) In the storage box power supply structure for a saddled vehicle according to the above-mentioned (1), the hook (33) may include a longitudinal extension section (33b) integrally provided with the hook-side terminal (70) and extending in a forward/rearward direction.

(3) In the storage box power supply structure for a saddled vehicle according to the above-mentioned (2), the longitudinal extension section (33b) may include a longitudinal wall section (33d) extending upward from the hook-side terminal (70) and configured to abut a lower surface of the carrier (50) when the storage box (30) is mounted on the carrier (50).

(4) In the storage box power supply structure for a saddled vehicle according to the above-mentioned (2) or (3), the hook-side terminal (70) may be a male terminal, and at least a part of the hook-side terminal (70) may be formed in a plate shape extending in an extending direction of the longitudinal extension section (33b).

(5) In the storage box power supply structure for a saddled vehicle according to one of the above-mentioned (1) to (4), a tip (70t) of the hook-side terminal (70) may be disposed further inward than a tip (33t) of the hook (33).

(6) In the storage box power supply structure for a saddled vehicle according to any one of the above-mentioned (1) to (5), a hook-side case (110) that surrounds the hook-side terminal (70) may be provided inside the hook (33), and a longitudinal length (L2) of the hook-side terminal (70) may be smaller than a longitudinal length (L1) of the hook-side case (110).

(7) In the storage box power supply structure for a saddled vehicle according to any one of the above-mentioned (1) to (6), the receiving-side terminal (80) may be disposed on the carrier (50) on the side of the lower surface.

(8) In the storage box power supply structure for a saddled vehicle according to any one the above-mentioned (1) to (7), the receiving-side terminal (80) may be a female terminal and comprise a pair of terminal pieces (81) that sandwiches the hook-side terminal (70).

(9) In the storage box power supply structure for a saddled vehicle according to the above-mentioned (8), the pair of terminal pieces (81) may face each other in a vehicle width direction.

(10) In the storage box power supply structure for a saddled vehicle according to any one of the above-mentioned (1) to (9), a receiving-side case (120) surrounding the receiving-side terminal (80) and formed in a box shape that opens downward may be provided in the hook receiving section (53).

(11) In the storage box power supply structure for a saddled vehicle according to the above-mentioned (10), the hook (33) may include: a downward extension section (33a) extending downward from a lower section of the storage box (30); and a rearward extension section (33b) extending rearward from a lower end of the downward extension section (33a), and a rearward opening section (53h) that opens rearward to receive the rearward extension section (33b) from the front may be formed in the hook receiving section (53) on the side of the lower surface.

(12) In the storage box power supply structure for a saddled vehicle according to any one of the above-mentioned (1) to (11), a vertical opening section (51h) that opens upward and downward in the vicinity of the hook receiving section (53) may be formed in the carrier (50).

(13) The storage box power supply structure for a saddled vehicle according to any one of the above-mentioned (1) to (12) may further include a lid member (90) detachably provided on the carrier (50) and configured to cover the hook receiving section (53) when the storage box (30) is not mounted on the carrier (50).

(14) In the storage box power supply structure for a saddled vehicle according to any one of the above-mentioned (1) to (13), the pair of hooks (33) may be provided on left and right sides.

Advantage of the Invention

According to the storage box power supply structure for a saddled vehicle according to the aspect (1) of the present invention, since the hook-side terminal provided inside the hook and configured to supply electric power to the electrical component and the receiving-side terminal provided in the hook receiving section and connected to the hook-side terminal when the storage box is mounted on the carrier are provided, the following effects are exhibited. Since the hook can be hooked into the hook receiving section, the terminal can be supported with rigidity. In addition, since the power supply structure is provided inside the hook, there is no need to provide a new power supply part on a bottom section of the storage box, and also there is no need to greatly change shapes of the storage box and the carrier. Accordingly, it is possible to provide the power supply part in an area having resistance to vibrations and high rigidity as a power supply structure using a conventional structure without providing the new power supply part in the storage box.

In addition, self-cleaning of the terminal can be performed by friction when the hook is attached to the hook receiving section. For example, it is possible to remove an oxide film of the terminal or remove foreign substances such as attritional grit or the like.

In addition, since the hook-side terminal is provided inside the hook, the hook-side terminal is less likely to be exposed to the outside. Accordingly, since foreign substances such as dust or the like are less likely to adhere to the hook-side terminal, contact reliability of the terminal can be maintained.

According to the storage box power supply structure for a saddled vehicle according to the above-mentioned (2) of the present invention, since the hook includes the longitudinal extension section with which the hook-side terminal is provided integrally and extending in the forward/rearward direction, the following effects are exhibited. When the hook is attached to the hook receiving section, a sliding operation of the longitudinal extension section in the forward/rearward direction can be applied. Accordingly, attritional grit in the contact section can be prevented while connection to the terminal is stabilized.

According to the storage box power supply structure for a saddled vehicle according to the above-mentioned (3) of the present invention, since the longitudinal extension section includes the longitudinal wall section extending upward from the hook-side terminal and configured to abut the lower surface of the carrier when the storage box is mounted on the carrier, the following effects are exhibited. Since the upper end of the longitudinal wall section and the lower surface of the carrier become the receiving section of the load, it is possible to prevent a load from being applied to the power supply part.

According to the storage box power supply structure for a saddled vehicle according to the above-mentioned (4) of the present invention, since the hook-side terminal is a male terminal and at least a part of the hook-side terminal is formed in a plate shape extending in the extending direction of the longitudinal extension section, flexibility of the vehicle in the width direction can be absorbed by the hook-side terminal. Accordingly, the power supply part can be provided in the area having resistance to vibrations while variations at the connecting position to the terminal are absorbed.

In addition, when the hook is attached to the hook receiving section, a sliding operation of the hook-side terminal in the forward/rearward direction can be applied. Accordingly, attritional grit in the contact section can be prevented while connection to the terminal is stabilized.

According to the storage box power supply structure for a saddled vehicle according to the above-mentioned (5) of the present invention, since the tip of the hook-side terminal is disposed inside the tip of the hook, the hook-side terminal and the receiving-side terminal are connected after the hook and the hook receiving section are positioned. Accordingly, when the terminal on the side of the storage box and the terminal on the side of the carrier are connected, positioning of the terminal can be easily performed.

According to the storage box power supply structure for a saddled vehicle according to the above-mentioned (6) of the present invention, since the hook-side case configured to cover the hook-side terminal is provided inside the hook and the longitudinal length of the hook-side terminal is smaller than the longitudinal length of the hook-side case, the hook-side terminal and the receiving-side terminal are connected after the hook-side case is positioned. Accordingly, when the terminal on the side of the storage box and the terminal on the side of the carrier are connected, positioning of the terminal can be easily performed.

According to the storage box power supply structure for a saddled vehicle according to the above-mentioned (7) of the present invention, since the receiving-side terminal is disposed on the carrier on the side of the lower surface, the receiving-side terminal can be supported with rigidity.

According to the storage box power supply structure for a saddled vehicle according to the above-mentioned (8) of the present invention, since the receiving-side terminal is the female terminal and includes the pair of terminal pieces that sandwiches the hook-side terminal, the following effects are exhibited. In comparison with the case in which the receiving-side terminal includes only one terminal piece, connection between the hook-side terminal and the receiving-side terminal can be reliably performed.

According to the storage box power supply structure for a saddled vehicle according to the above-mentioned (9) of the present invention, since the pair of terminal pieces face each other in the vehicle width direction, flexibility in the upward/downward direction can be absorbed by the pair of terminal pieces. Accordingly, the power supply part can be provided in the area having resistance to vibrations while variations at the connecting position to the terminal are absorbed.

According to the storage box power supply structure for a saddled vehicle according to the above-mentioned (10) of the present invention, since the receiving-side case surrounding the receiving-side terminal and having a box shape that opens downward is provided in the hook receiving section, the receiving-side terminal cannot be easily exposed to the outside by the receiving-side case.

According to the storage box power supply structure for a saddled vehicle according to the above-mentioned (11) of the present invention, since the rearward opening section that opens rearward to receive the rearward extension section of the hook from the front is provided in the hook receiving section on the side of the lower surface side, the following effects are exhibited. In comparison with the case in which the hook receiving section can receive the hook from the rear, the hook can easily be made to approach the hook receiving section. For example, when the carrier is a rear carrier provided in the rear section of the vehicle body, the storage box can be easily mounted on the rear carrier.

According to the storage box power supply structure for a saddled vehicle according to the above-mentioned (12) of the present invention, since the vertical opening section that opens upward and downward in the vicinity of the hook receiving section is provided in the carrier, drainage can be performed through the opening of the vertical opening section. For example, even if the storage box is mounted on the carrier when it is raining, it is possible to prevent rain water or the like from entering the hook receiving section.

According to the storage box power supply structure for a saddled vehicle according to the above-mentioned (13) of the present invention, since the lid member detachably provided on the carrier and configured to cover the hook receiving section when the storage box is not mounted on the carrier is further provided, the hook receiving section is not exposed to the outside by the lid member. Accordingly, when the storage box is not mounted on the carrier, it is possible to prevent foreign substances such as water, dust, and the like, from entering the hook receiving section.

According to the storage box power supply structure for a saddled vehicle according to the above-mentioned (14) of the present invention, since the pair of hooks are provided on left and right sides, the following effects are exhibited. Since the storage box and the carrier are connected with good balance on left and right sides, in comparison with only one hook being provided, the power supply part can be provided in the area having more resistance to vibrations.

DESCRIPTION OF THE EMBODIMENTS

Figure 1:
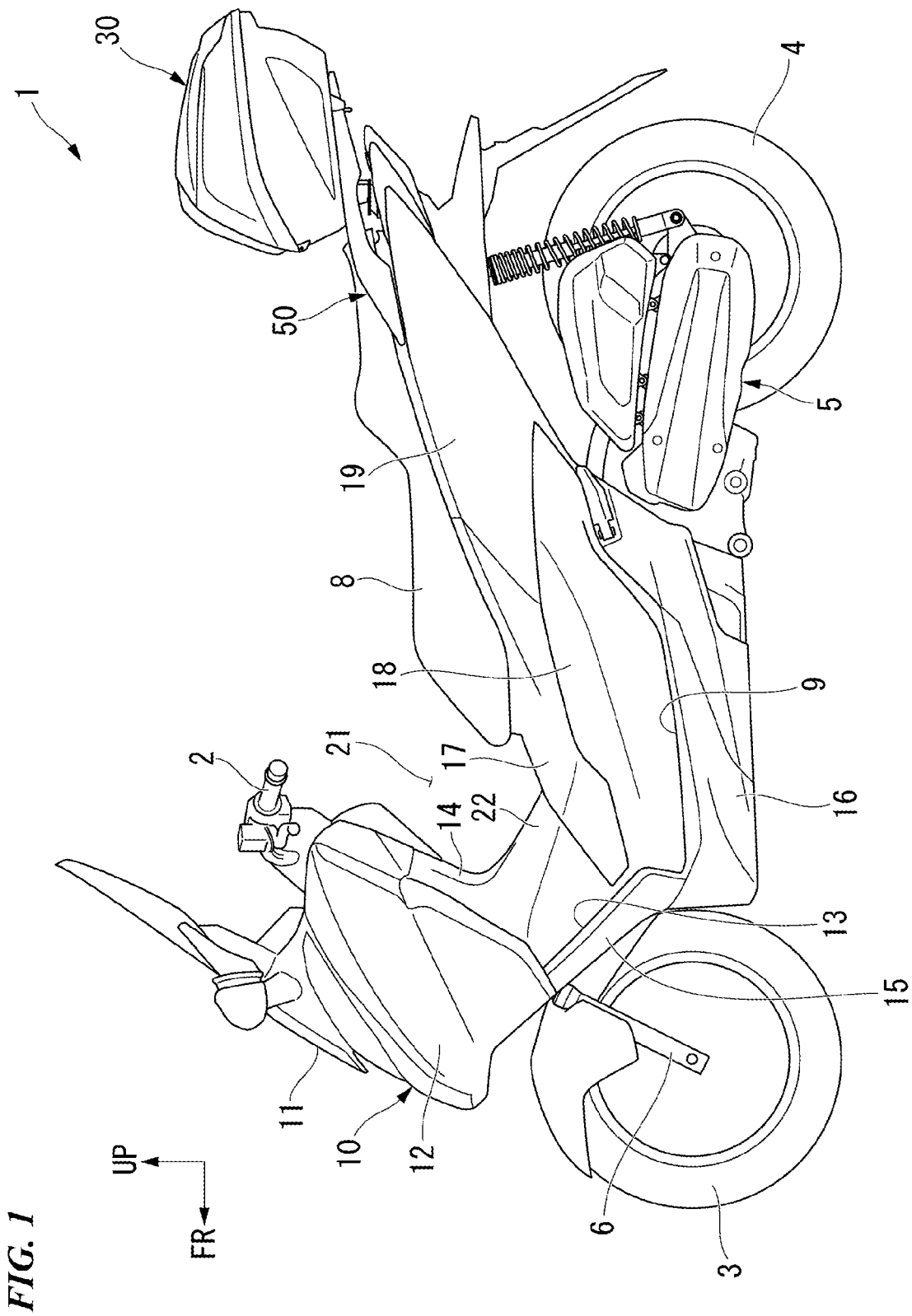
FIG. 1 is a left side view of a motorcycle according to an embodiment.

Hereinafter, an embodiment of the present invention will be described with reference the accompanying drawings. Further, directions of forward, rearward, leftward, rightward, and so on, in the following description are the same as directions in a vehicle described below unless the context clearly indicates otherwise. In addition, in appropriate places in the drawings used in the following description, an arrow FR indicates a forward direction with respect to a vehicle, an arrow LH indicates a leftward direction with respect to the vehicle, and an arrow UP indicates an upward direction with respect to the vehicle. In addition, reference sign CL indicates a lateral centerline of a vehicle body.

<Entire Vehicle>

FIG. 1 shows a unit swing motorcycle 1 as an example of a saddled vehicle. Referring to FIG. 1, the motorcycle 1 includes a front wheel 3 steered by a handle 2, and a rear wheel 4 driven by a power unit 5 including a power source. Hereinafter, the motorcycle may be simply referred to as "a vehicle." The motorcycle 1 of the embodiment is a scooter type vehicle having step floors 9 on which an occupant sitting on a seat 8 puts his/her legs.

Steering system parts including the handle 2 and the front wheel 3 are steerably pivoted by a head pipe (not shown) of a front end of a vehicle body frame. An outer circumference of the vehicle body frame is covered with a vehicle body cover 10. In FIG. 1, reference sign 6 indicates front forks.

A straddling section 21 having a relatively low height in the vehicle is provided between the handle 2 and the seat 8. The step floors 9 are provided on both of left and right sides of the straddling section 21. A center tunnel 22 extending forward and rearward to form a convex shape swelling upward is provided between the left and right step floors 9.

The vehicle body cover 10 includes a front center cover 11 configured to cover a periphery of a head pipe from a forward side, left and right front side covers 12 configured to cover the periphery of the head pipe from a front outward side, a front inner cover 14 configured to cover the periphery of the head pipe from a rearward side and configured to form a front section of the center tunnel 22 and left and right footrests 13, left and right floor front covers 15 continuous with lower rear sides of the left and right front side covers 12, left and right floor side covers 16 continuous with lower downward sides of the left and right floor front covers 15, a center upper cover 17 continuous with a lower rearward side of the front inner cover 14 and configured to form an upper surface of a rear section of the center tunnel 22, left and right center side covers 18 continuous with a rearward side of a lower section of the front inner cover 14 and configured to form a side surface of a rear section of the center tunnel 22, and left and right rear side covers 19 continuous with rearward sides of the center upper cover 17 and the left and right center side covers 18 and configured to cover the rear section of the vehicle body from a lateral side.

<Storage Box Power Supply Structure>

As shown in FIG. 1, a storage box power supply structure 25 (see FIG. 15) configured to supply electric power to electrical components provided in a storage box 30 or the like is provided in the rear section of the vehicle. The storage box power supply structure 25 includes the storage box 30, a carrier 50 configured to detachably mount the storage box 30 on the vehicle body, hooks 33 (the front hooks 33 shown in FIG. 5) configured to connect the storage box 30 to the carrier 50, hook receiving sections 53 (the front hook receiving sections 53 shown in FIG. 7) configured to receive the hooks 33, hook-side terminals 70 (see FIG. 13) provided inside the hooks 33 and configured to supply electric power to an electrical component 46 (a lid lamp 46 shown in FIG. 2), and receiving-side terminals 80 (see FIG. 13) provided on the hook receiving sections 53 and connected to the hook-side terminals 70 when the storage box 30 is mounted on the carrier 50.

<Storage Box>

Figure 10:
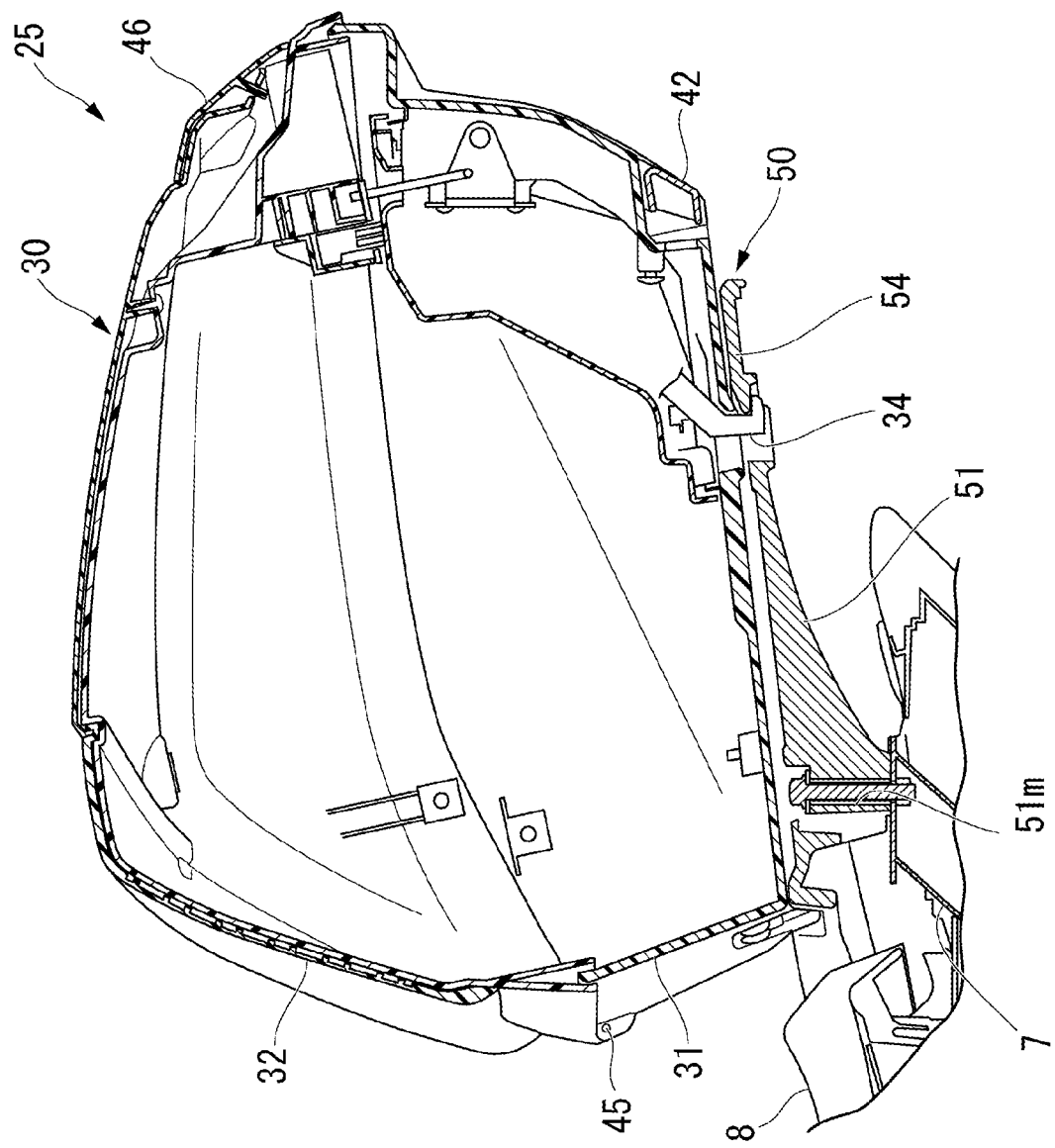
FIG. 10 is a view including a cross section taken along line X-X in FIG. 3.

As shown in FIG. 10, the storage box 30 is detachably attached to the carrier 50. The storage box 30 can store articles such as a helmet and the like. The storage box 30 includes a box main body 31 formed in a box shape that opens upward, and a lid 32 provided on an upper section of the box main body 31 to be opened and closed.

Figure 5:
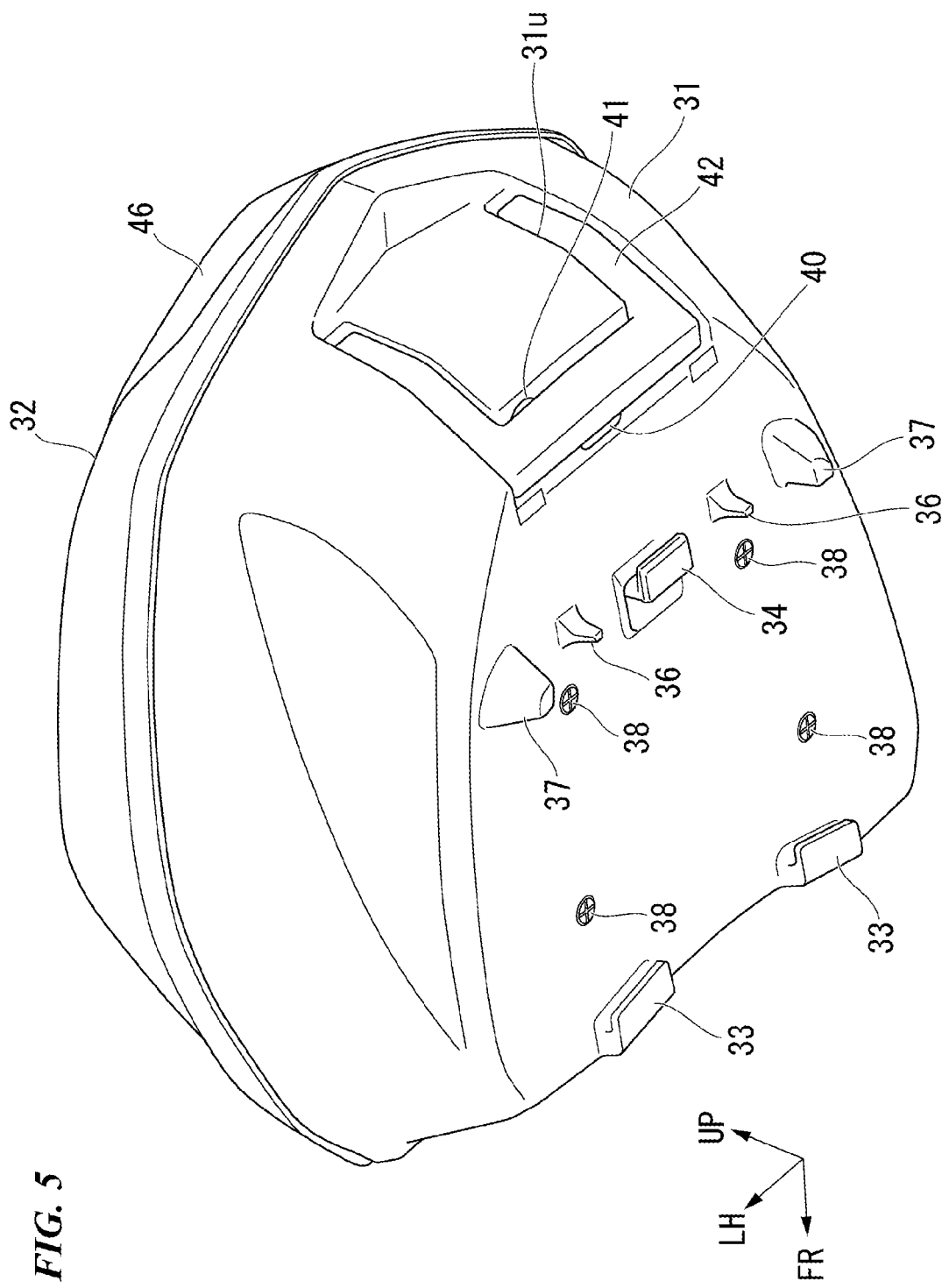
FIG. 5 is a perspective view showing the storage box according to the embodiment from below to the left.

As shown in FIG. 5, the box main body 31 includes the pair of left and right front hooks 33 disposed on a front lower section of the box main body 31, a rear hook 34 disposed at a center of a rear lower section of the box main body 31, a pair of left and right side stoppers 36 that face each other via the rear hook 34, a pair of left and right leg sections 37 that face each other via the left and right side stoppers 36, and a plurality of (four shown in the drawing) elastic members 38 provided on a lower surface of the box main body 31.

Figure 3:
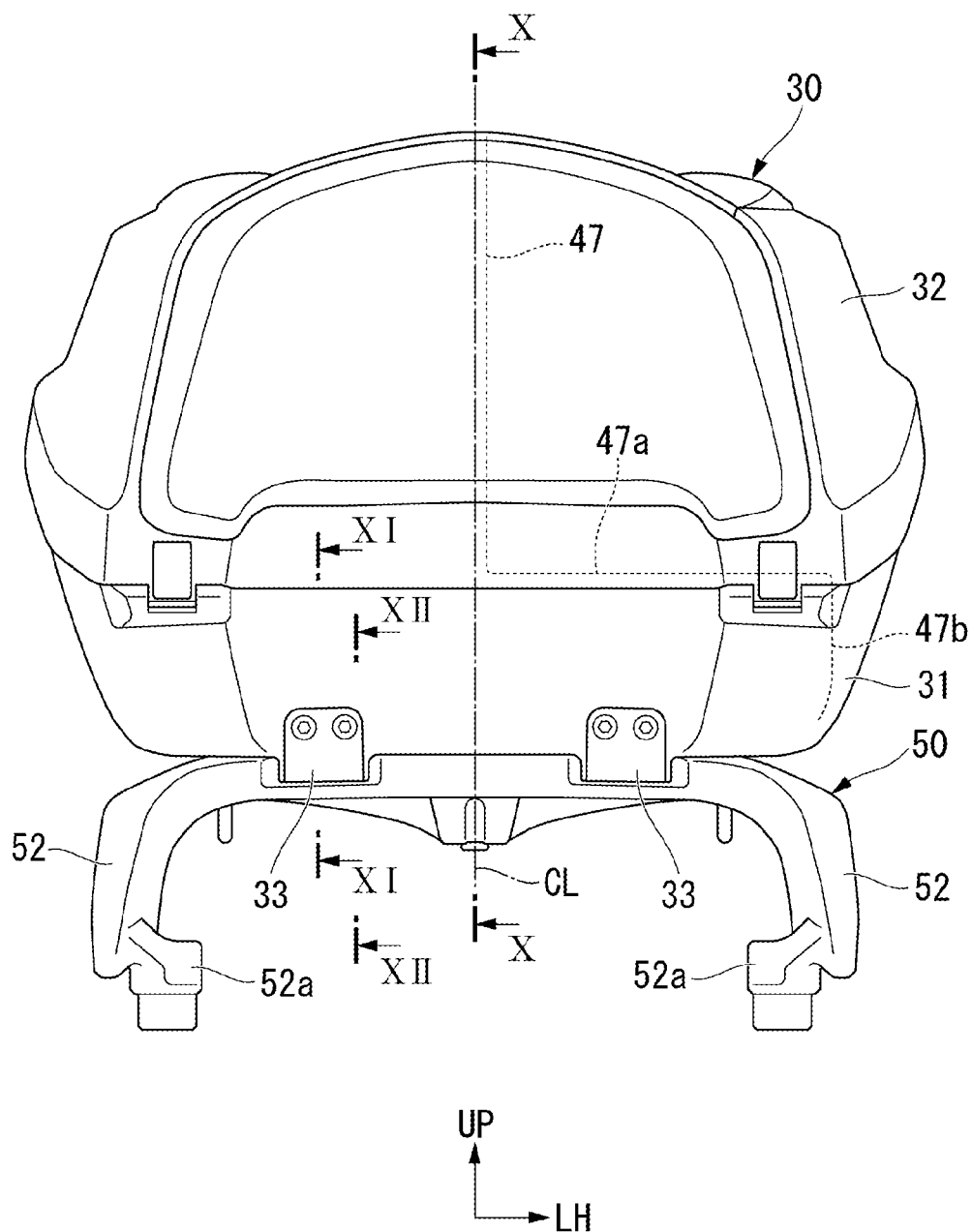
FIG. 3 is a front view of a storage box according to the embodiment.
Figure 4:
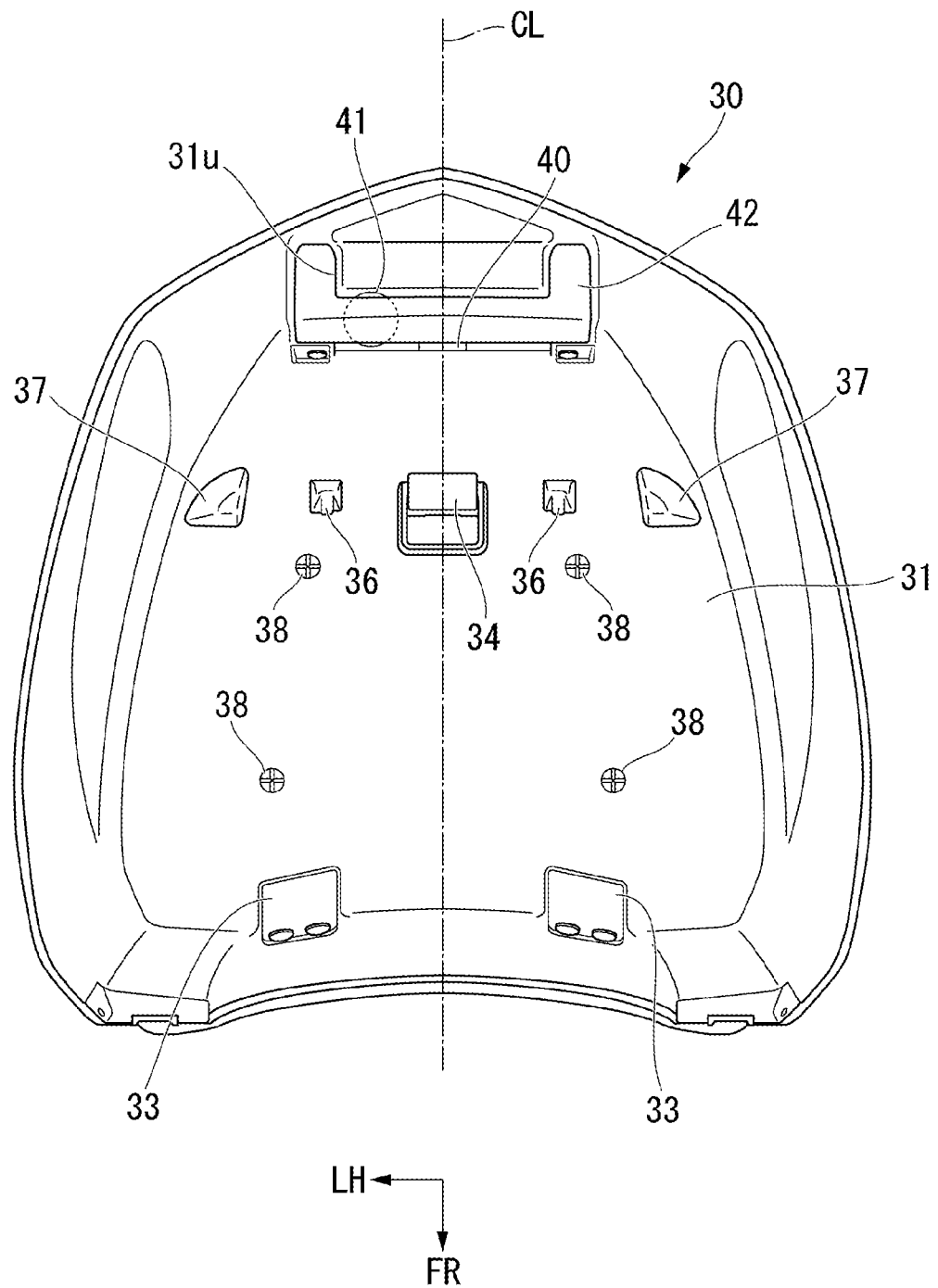
FIG. 4 is a bottom view of the storage box according to the embodiment.
Figure 11:
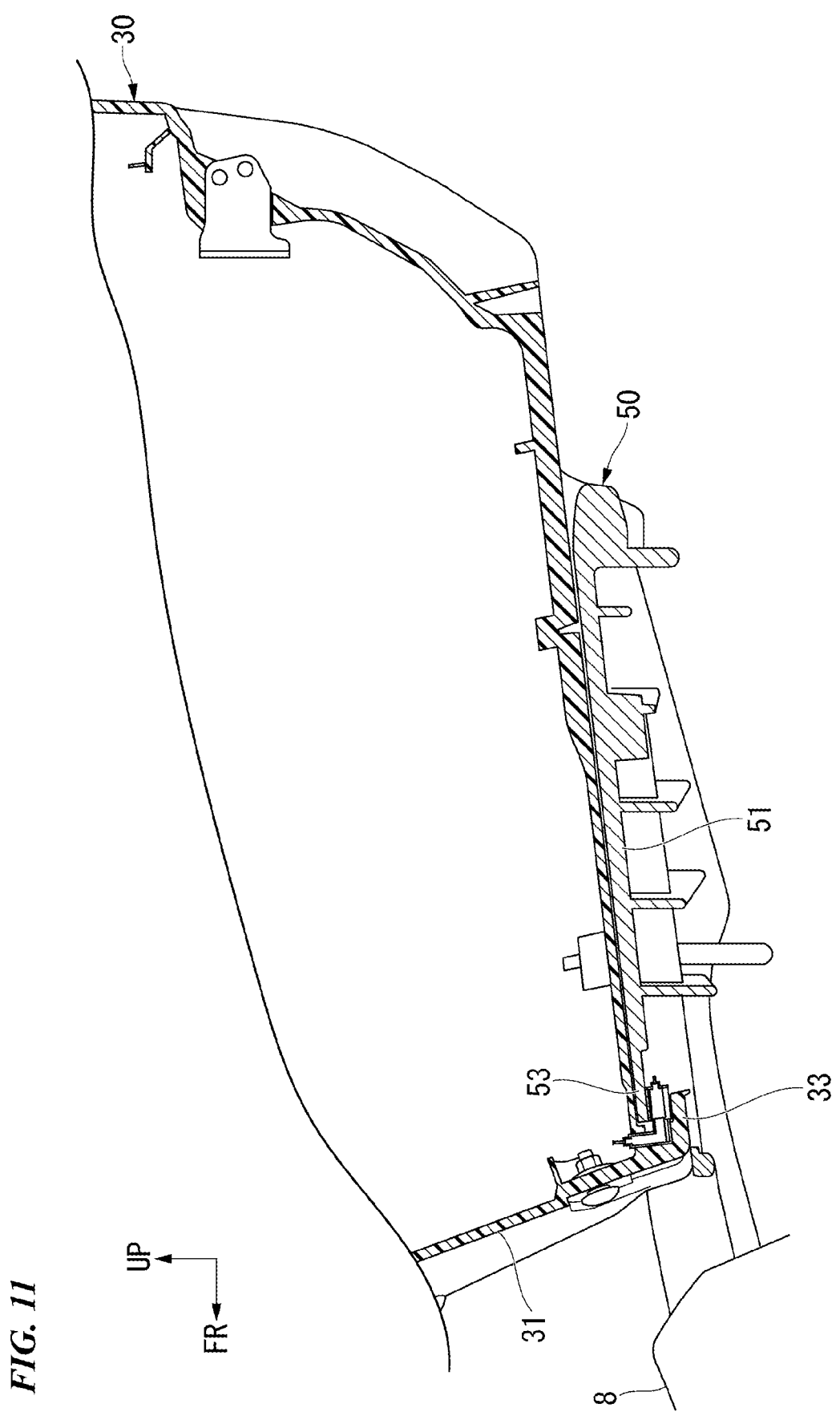
FIG. 11 is a view including a cross section taken along line XI-XI in FIG. 3.

As shown in FIG. 3, the pair of left and right front hooks 33 are disposed line-symmetrically with respect to a vehicle body lateral centerline CL as a symmetrical axis. Reinforcement sections of the left and right front hooks 33 are fixed to a front lower section of the box main body 31 by fastening members such as bolts or the like. As shown in FIG. 11, the left and right front hooks 33 are formed in an L shape extending downward from a front lower section of the box main body 31 and then extending to be bent rearward. When seen in a bottom view of FIG. 4, rear ends of the left and right front hooks 33 are inclined to be disposed rearward as they go inward in a vehicle width direction.

As shown in FIG. 10, the rear hook 34 is movable in conjunction with a pivoting operation of a key (not shown). For example, the rear hook 34 is movable between an engaging position and an engagement releasing position with respect to a rear hook receiving section 54 in conjunction with an operation of a rear hook locking mechanism (not shown) in conjunction with a pivoting operation of the key. The rear hook 34 is formed in an L shape extending downward from a lower section of the box main body 31 and then extending to be bent rearward.

As shown in FIG. 5, the left and right side stoppers 36 and the left and right leg sections 37 protrude downward from a lower surface of the box main body 31. A protrusion height of each of the left and right side stoppers 36 is smaller than a protrusion height of each of the left and right leg sections 37. Further, the left and right side stoppers 36 function as a load receiving section configured to receive a load in the forward/rearward direction.

The four elastic members 38 are disposed between the front and rear left and right front hooks 33 and left and right side stoppers 36. The four elastic members 38 are disposed at intervals in the forward/rearward direction and the vehicle width direction. For example, the elastic members 38 are vibration-proof rubbers.

A handle 42 is swingably attached to a rear section of the box main body 31. In a state in FIG. 5, the handle 42 is in a receiving state in which the handle 42 is received in a U-shaped groove 31*u*. In the receiving state, the handle 42 is disposed along a rear surface of the box main body 31.

The lid 32 is a box-shaped member configured to cover the box main body 31 from above. As shown in FIG. 10, the lid 32 is swingably attached to a front end portion of the box main body 31 via a rocking shaft 45. The lid 32 can be locked by a lid locking mechanism (not shown).

The lid lamp 46 serving as an electrical component is provided in a rear section of the lid 32. For example, the lid lamp 46 is a light emitting diode (LED). The lid lamp 46 is connected to the hook-side terminals 70 (see FIG. 13) via a cord 47 (see FIG. 3) routed on an inner surface of the lid 32.

For example, a portion 47*a* (see FIG. 3) of the cord 47 close to a front section of the lid 32 is preferably disposed parallel to the rocking shaft 45 (see FIG. 10). Accordingly, bending of the cord 47 can be avoided and disconnection thereof can be prevented.

For example, a portion 47*b* (see FIG. 3) of the cord 47 close to a front section of the box main body 31 is preferably disposed along an inner wall of a corner section of the box main body 31. Accordingly, even when articles such as a helmet and the like are stored in the storage box 30, it is possible to prevent the cord 47 from coming in contact with the articles such as a helmet or the like.

<Carrier>

Figure 2:
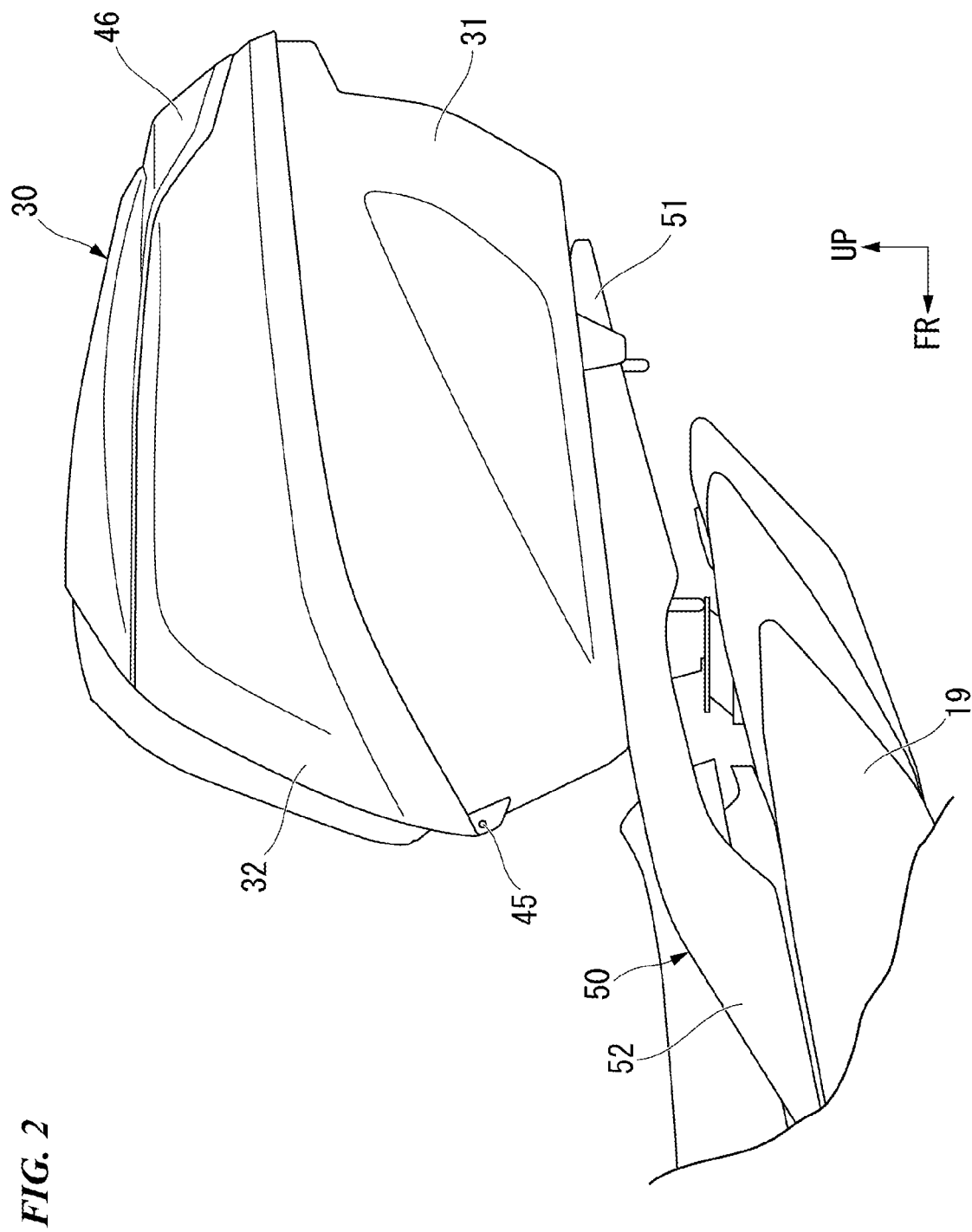
FIG. 2 is a left side view of a vehicle rear section of the motorcycle according to the embodiment.
Figure 7:
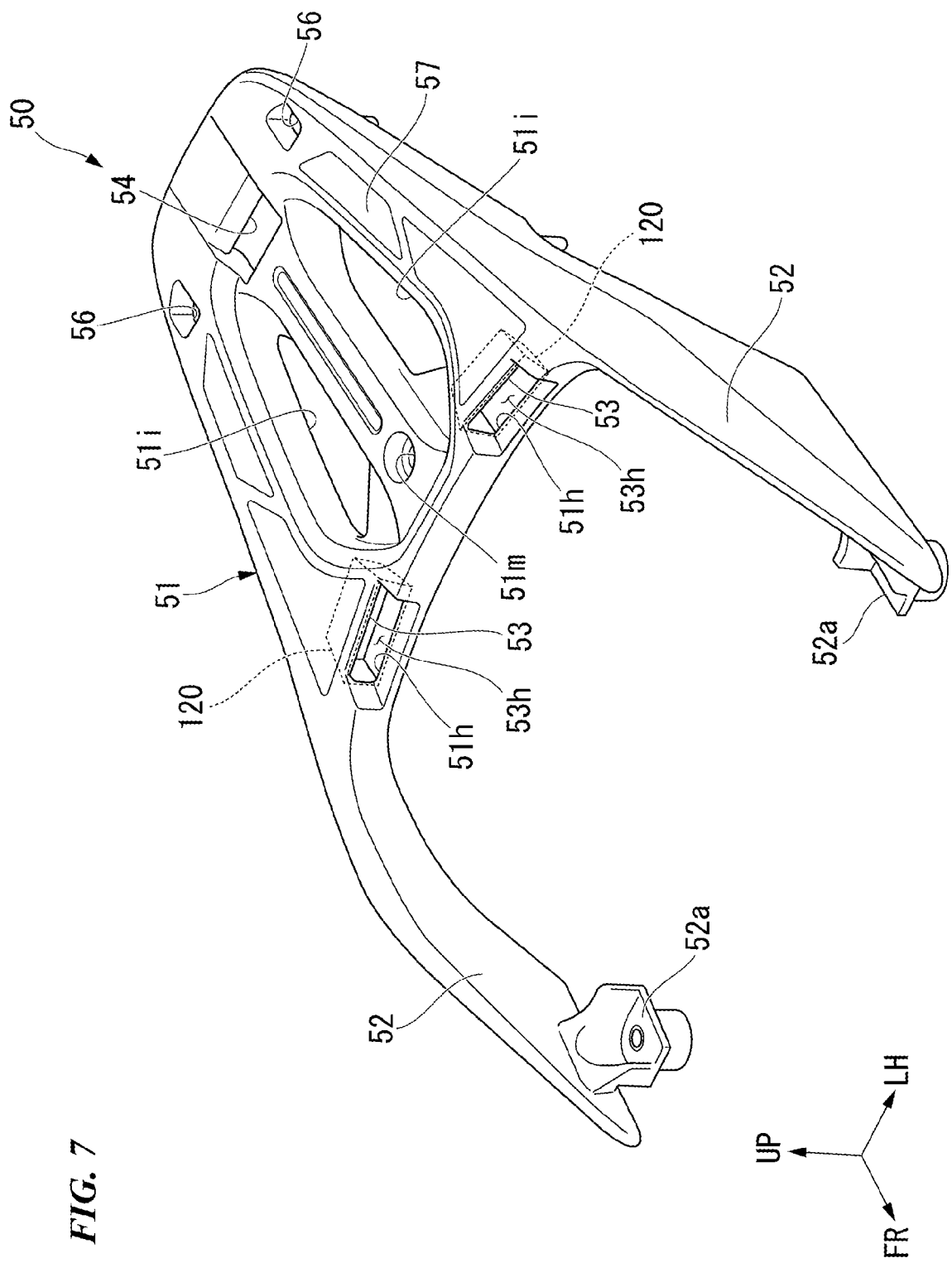
FIG. 7 is a perspective view showing the carrier according to the embodiment from above to the left.

As shown in FIG. 2, the carrier 50 is configured to detachably mount the storage box 30 on the vehicle body. As shown in FIG. 7, the carrier 50 includes a carrier main body 51 on which the storage box 30 is mounted, and a pair of left and right grab rails 52 that are grabbed by an occupant. The carrier main body 51 and the left and right grab rails 52 are integrally formed of the same member.

Figure 8:
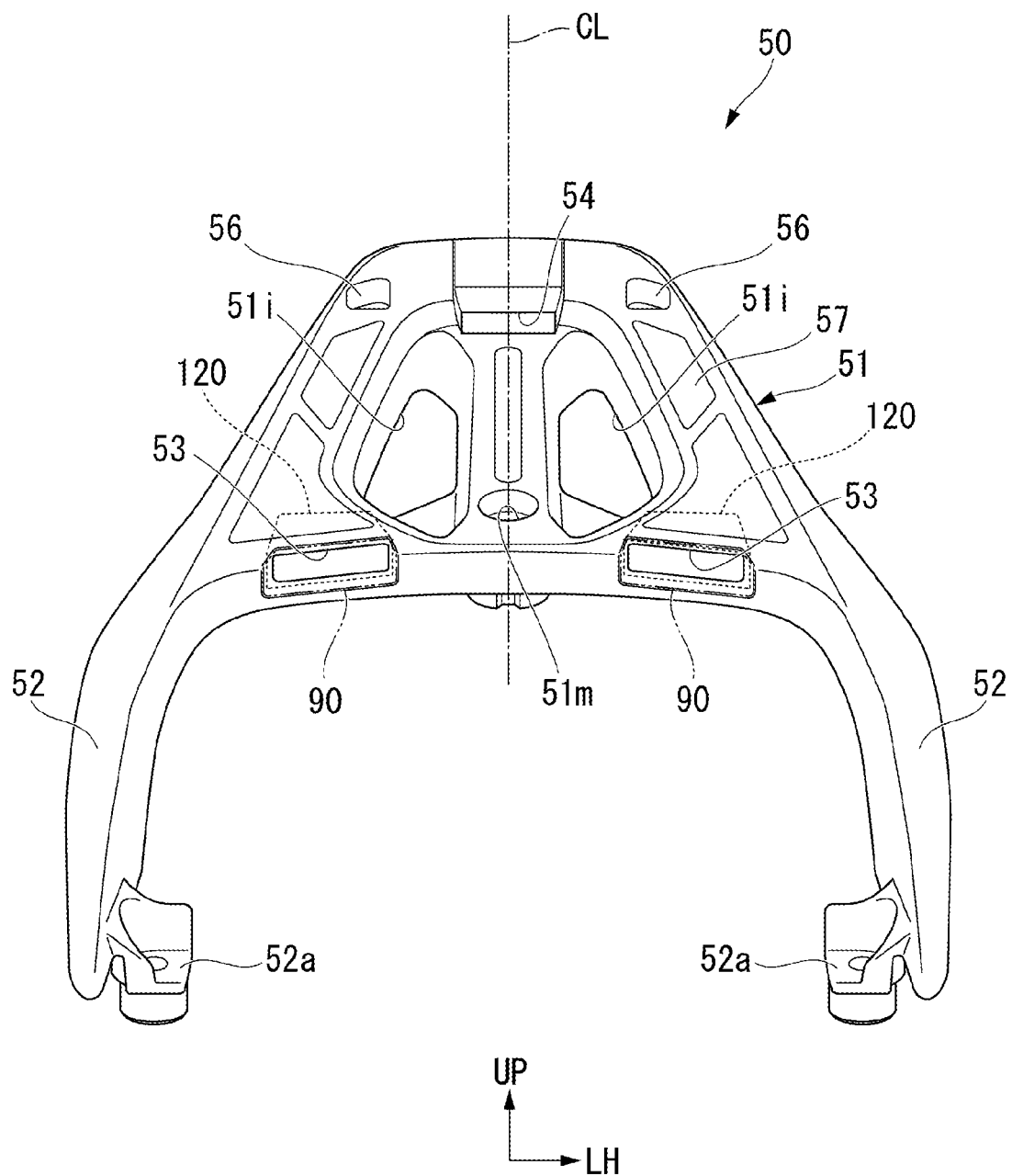
FIG. 8 is a perspective view showing the carrier according to the embodiment from above to the front.
Figure 12:
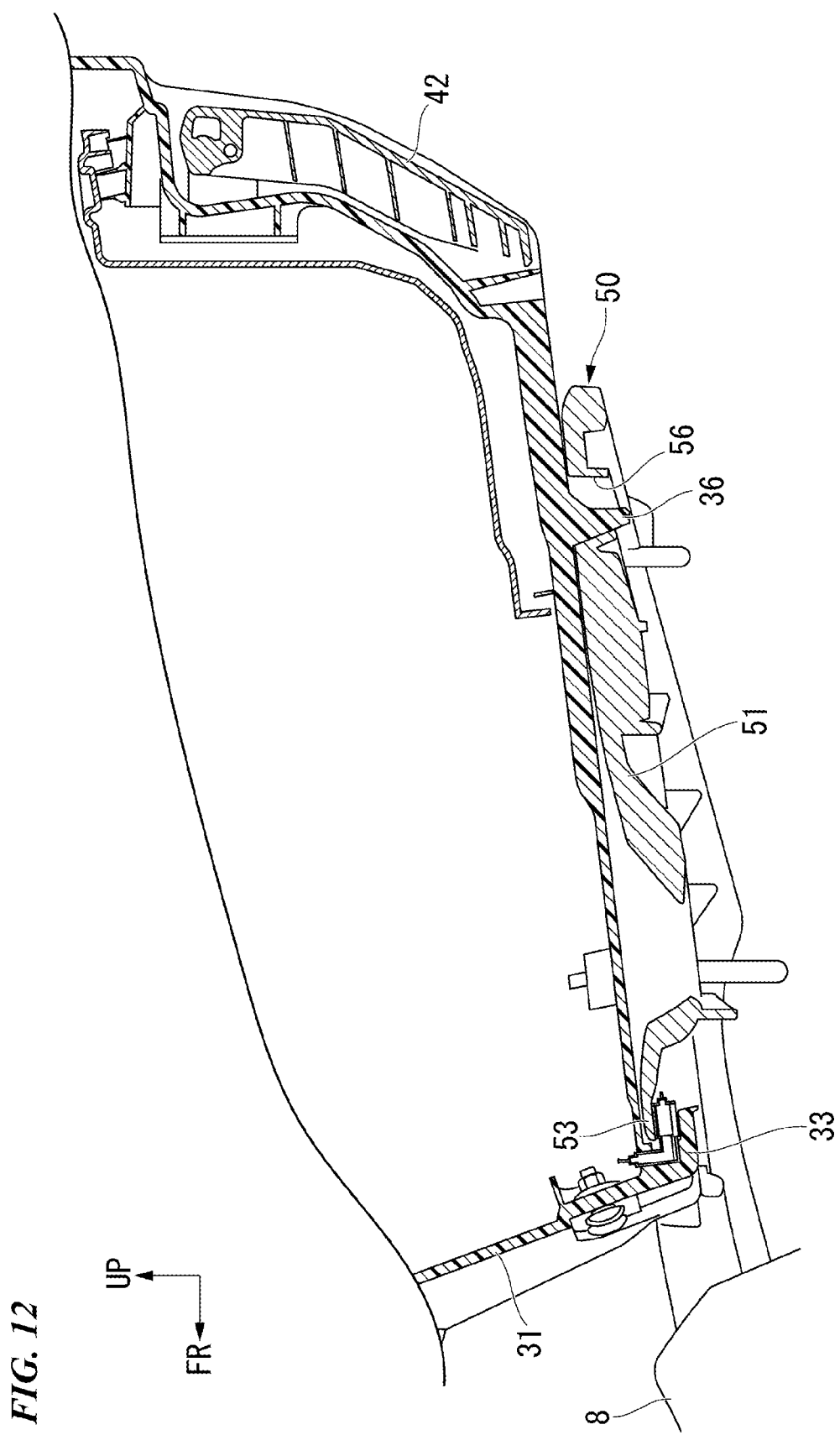
FIG. 12 is a view including a cross section taken along line XII-XII in FIG. 3.

As shown in FIG. 8, the carrier main body 51 has an external form having a width in the vehicle width direction that is reduced rearward. As shown in FIG. 7, the carrier main body 51 includes the pair of left and right front hook receiving sections 53 (see FIG. 11) configured to receive the left and right front hooks 33 (see FIG. 5), the rear hook receiving section 54 (see FIG. 10) configured to receive the rear hook 34 (see FIG. 5), a pair of left and right side insertion holes 56 (see FIG. 12) into which the left and right side stoppers 36 (see FIG. 5) are inserted, and a seat surface 57 with which the elastic members 38 (see FIG. 5) abut, when the storage box 30 (see FIG. 2) is mounted on the carrier main body 51.

Figure 6:
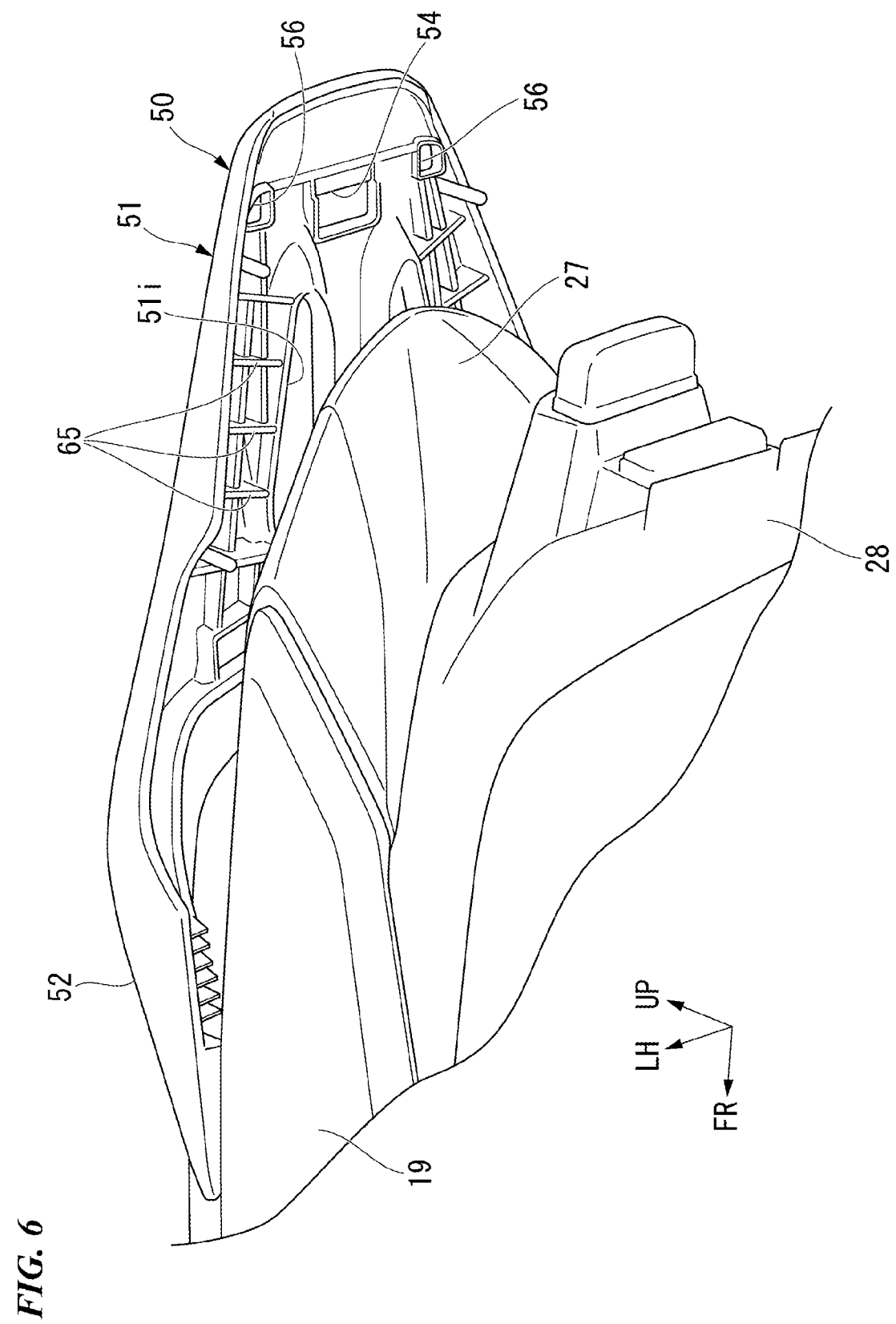
FIG. 6 is a perspective view of a vehicle rear section when the storage box according to the embodiment is removed from a carrier when seen from below to the left.

As shown in FIG. 7, vertical opening sections 51h that open upward and downward in the vicinity of the front hook receiving sections 53 are provided in the front section of the carrier main body 51. When seen in a bottom view of FIG. 9, the vertical opening sections 51h each have a long hole shape extending to be disposed rearward as it goes inward in the vehicle width direction. In FIG. 6, reference sign 27 designates a tail light, and reference sign 28 designates a rear fender.

Figure 9:
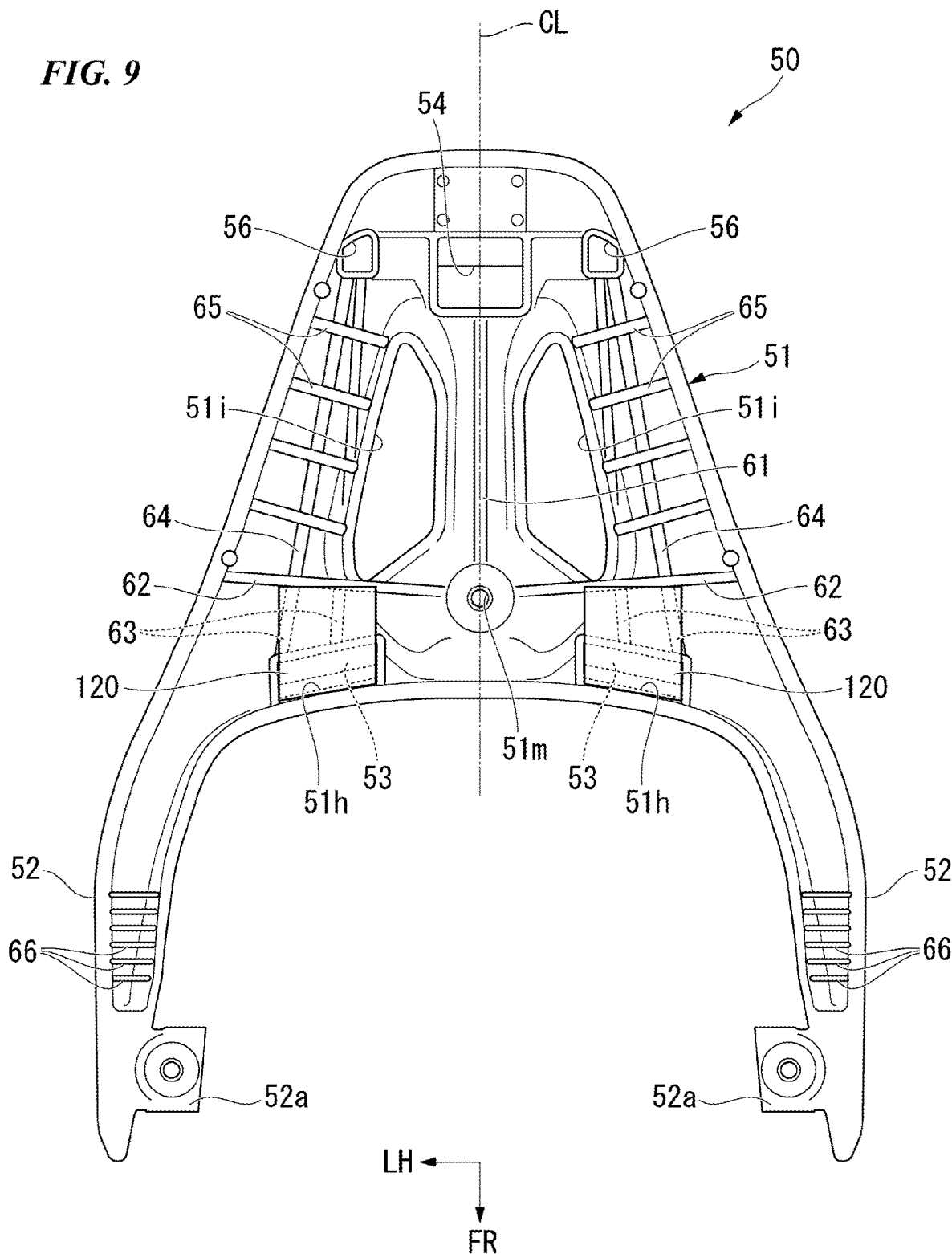
FIG. 9 is a bottom view of the carrier according to the embodiment.

As shown in FIG. 9, the carrier main body 51 has a pair of left and right opening sections 51i formed in the central section of the carrier main body 51 to open upward and downward, and a front section insertion hole 51m formed in the front section of the carrier main body 51 to open upward and downward.

When seen in a bottom view of FIG. 9, the left and right opening sections 51i each have a long hole shape extending forward and rearward.

When seen in a bottom view of FIG. 9, the front section insertion hole 51m has a circular shape. The front section insertion hole 51m is an insertion hole through which a shaft section of a bolt configured to fix the carrier main body 51 to a rear frame 7 (see FIG. 10) is inserted.

As shown in FIG. 8, the left and right grab rails 52 extend forward from an outer end portion of the front section of the carrier main body 51 in the vehicle width direction. When seen in a left side view of FIG. 2, upper edges of the left and right grab rails 52 are inclined to be disposed downward as they go forward. As shown in FIG. 8, inward protrusion sections 52a protruding inward from front end portions of the left and right grab rails 52 in the vehicle width direction are provided on the left and right grab rails 52. The inward protrusion sections 52a are fixed to the rear frame 7 (see FIG. 10) by fastening members (not shown) such as bolts or the like.

As shown in FIG. 9, a plurality of ribs 61 to 66 are provided on a lower section of the carrier 50. The plurality of ribs 61 to 66 are a first rib 61 extending forward and rearward to cross a forming section of the front section insertion hole 51m and the rear hook receiving section 54, a second rib 62 extending in the vehicle width direction to cross the forming section of the front section insertion hole 51m and an outer edge of the carrier main body 51 in the vehicle width direction, a third rib 63 extending to cross the left and right front hook receiving sections 53 and the second rib 62, a fourth rib 64 extending to cross forming sections of the side insertion holes 56 and the second rib 62, a fifth rib 65 extending to cross from outer edges of the left and right opening sections 51i in the vehicle width direction to an outer edge of the carrier main body 51 in the vehicle width direction, and sixth ribs 66 extending from front lower sections of the left and right grab rails 52 in the vehicle width direction.

<Front Hook>

As shown in FIG. 11, the front hooks 33 are provided on the side of the storage box 30. The front hooks 33 each are formed in an L shape extending downward from a front lower section of the box main body 31 and then extending to be bent rearward.

Figure 15:
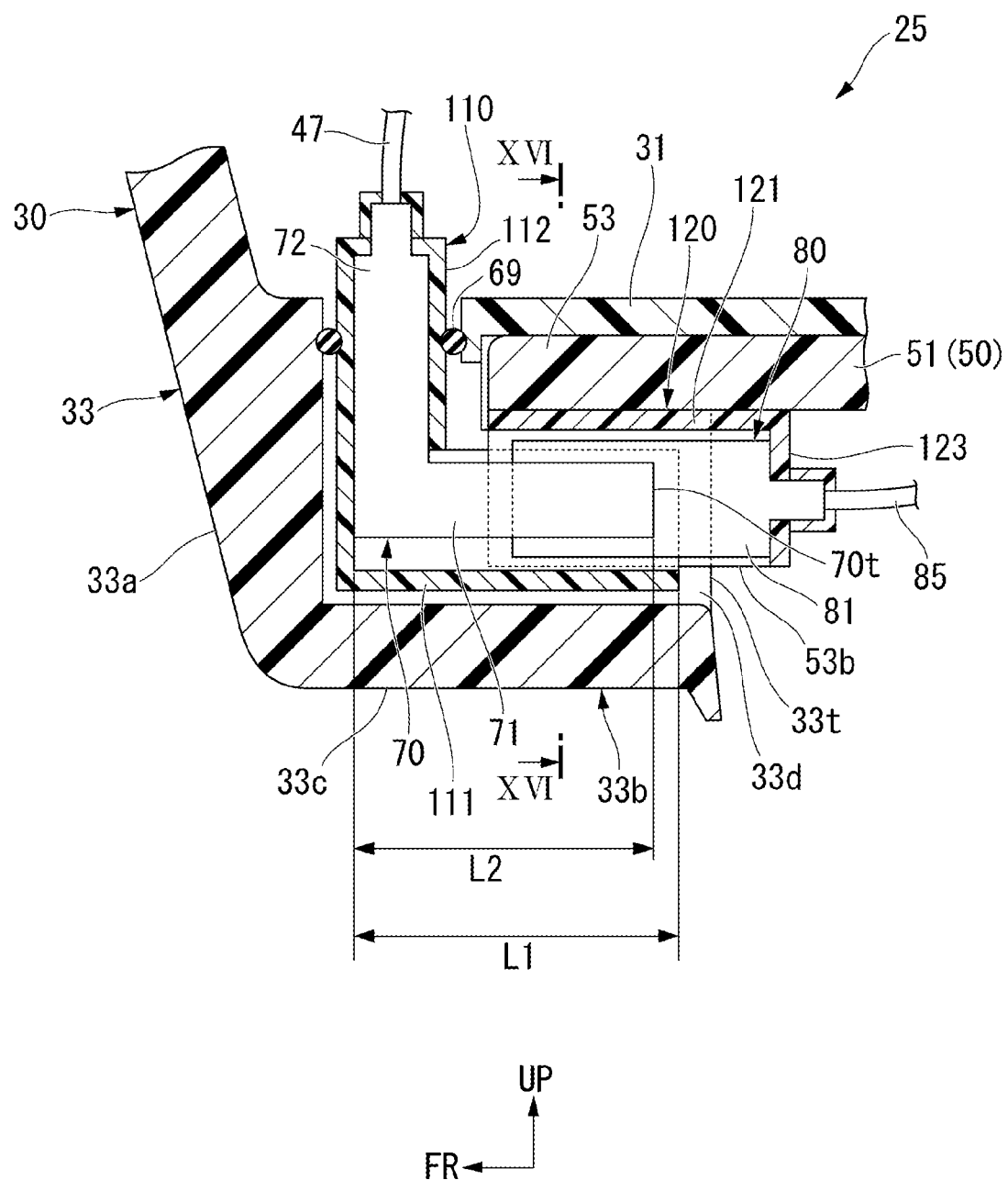
FIG. 15 is a view showing a connection state of the power supply part (the terminal connecting section) according to the embodiment and including a cross section corresponding to FIG. 11.
Figure 16:
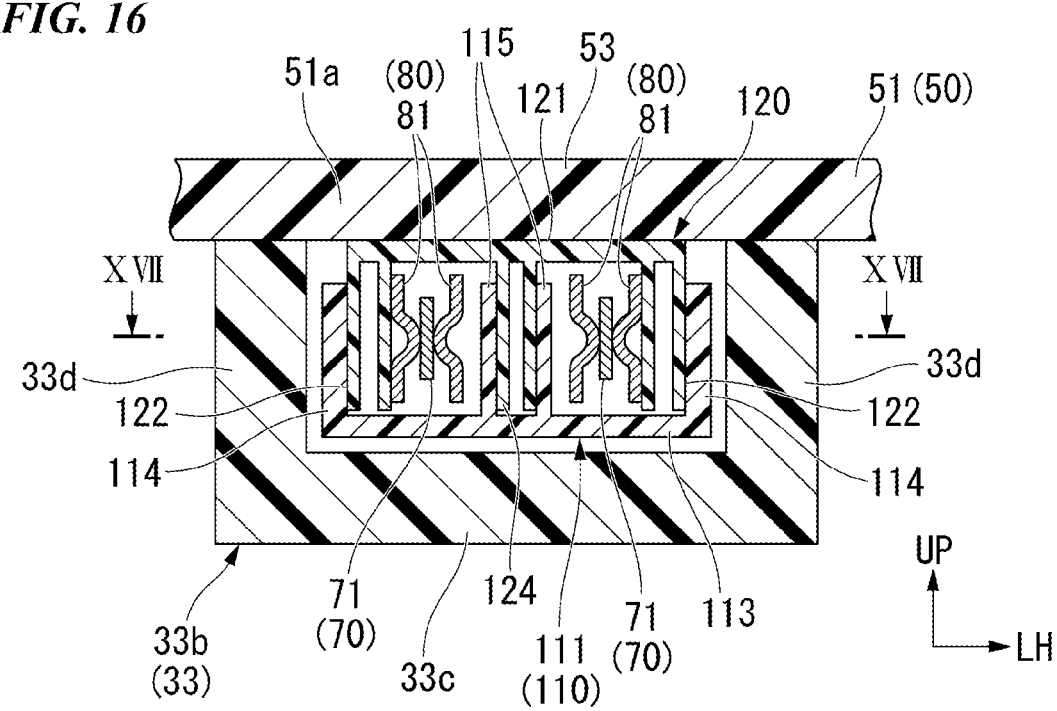
FIG. 16 is a view including a cross section taken along line XVI-XVI in FIG. 15.

As shown in FIG. 15, the front hooks 33 include downward extension sections 33a extending downward from a front lower section of the storage box 30 (see FIG. 11), and rearward extension sections 33b (longitudinal extension sections) extending rearward from lower ends of the downward extension sections 33a. The rearward extension sections 33b each have a box shape having a U-shaped cross section (see FIG. 16) that opens upward. As shown in FIG. 16, spaces configured to accommodate longitudinal extension case sections 111 in a hook-side case 110 are provided in the rearward extension sections 33b of the front hooks 33.

As shown in FIG. 15, the hook-side terminals 70 are integrally provided in the rearward extension sections 33b via the hook-side case 110.

As shown in FIG. 16, the rearward extension sections 33b include lower wall sections 33c configured to cover the hook-side terminals 70 from below, and longitudinal wall sections 33d configured to cover the left and right hook-side terminals 70 from an outward side in the vehicle width direction. As shown in FIG. 15, the longitudinal wall sections 33d extend upward from the hook-side terminals 70. Upper ends of the longitudinal wall sections 33d abut a lower surface of the carrier 50 when the storage box 30 is mounted on the carrier 50.

<Hook-Side Terminal>

As shown in FIG. 15, the hook-side terminals 70 are provided inside the front hooks 33. The hook-side terminals 70 are attached to the front hooks 33 via the hook-side case 110. The pair of hook-side terminals 70 are disposed on left and right sides at an interval. The hook-side terminals 70 are provided on the left and right front hooks 33, respectively. The hook-side terminals 70 each have an L shape extending along each of the front hooks 33. The hook-side terminals 70 are male terminals. A part of each of the hook-side terminals 70 is formed in a plate shape extending in the extending direction of each of the rearward extension sections 33b. The hook-side terminals 70 include longitudinal extension sections 71 extending forward and rearward along the rearward extension sections 33b of the front hooks 33, and upward extension sections 72 extending upward from front ends of the longitudinal extension sections 71.

As shown in FIG. 15, tips 70t of the hook-side terminals 70 are located inside tips 33t of the front hooks 33. In the embodiment, the tips 70t of the hook-side terminals 70 correspond to rear ends of the longitudinal extension sections 71, and the tips 33t of the front hooks 33 correspond to rear ends of the longitudinal wall sections 33d. That is, the rear ends of the longitudinal extension sections 71 are located in front of the rear ends of the longitudinal wall sections 33d.

Upper ends of the upward extension sections 72 are located above the upper ends of the front hooks 33. One end of the cord 47 is connected to the upper ends of the upward extension sections 72. Further, the other end of the cord 47 is connected to the lid lamp 46 (see FIG. 5).

<Hook-Side Case>

As shown in FIG. 15, the hook-side case 110 configured to surround the hook-side terminals 70 is provided inside the front hooks 33. The hook-side case 110 is formed in an L shape extending along the hook-side terminals 70. The hook-side case 110 is attached to the front hooks 33 via a seal member 69. The hook-side case 110 includes the longitudinal extension case sections 111 extending forward and rearward along the longitudinal extension sections 71 of the hook-side terminals 70, and upward extension case sections 112 extending upward from front ends of the longitudinal extension case sections 111.

In FIG. 15, a longitudinal length L1 of the longitudinal extension case section 111 of the hook-side case 110 is referred to as "a longitudinal length L1 of the hook-side case 110." In FIG. 15, a longitudinal length L2 of the longitudinal extension section 71 of the hook-side terminal 70 is referred to as "a longitudinal length L2 of the hook-side terminal 70." In the embodiment, the longitudinal length L2 of the hook-side terminal 70 is smaller than the longitudinal length L1 of the hook-side case 110 (L2<L1).

Figure 14:
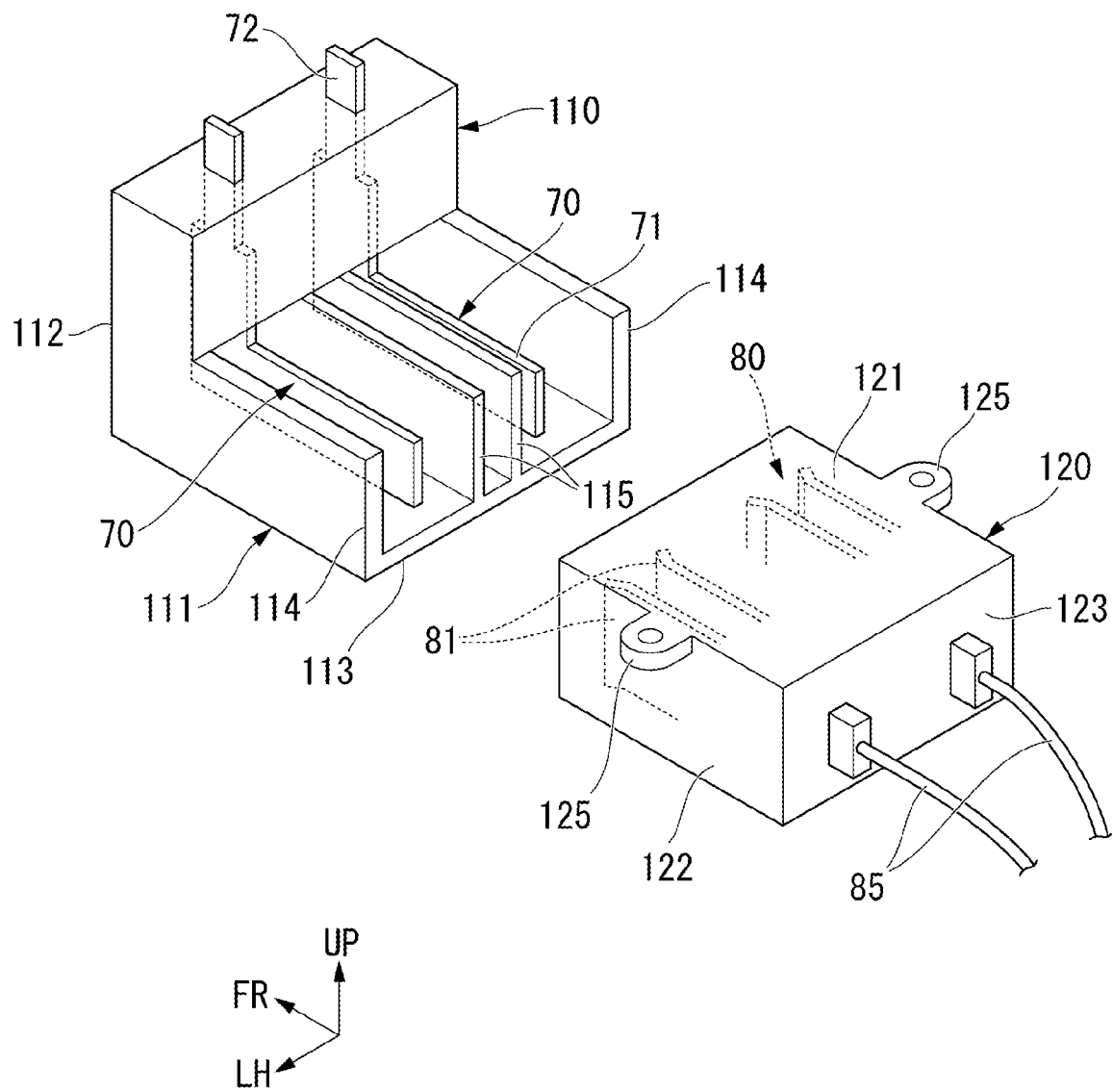
FIG. 14 is a perspective view showing the power supply part (the terminal connecting section) according to the embodiment from above to the left.

As shown in FIG. 14, the longitudinal extension case section 111 includes a hook terminal downward cover section 113 configured to cover the hook-side terminals 70, hook terminal lateral cover sections 114 configured to cover the left and right hook-side terminals 70 from an outward side in the vehicle width direction, and a pair of left and right hook terminal-side longitudinal wall sections 115 configured to divide an accommodating space of the left and right hook-side terminals 70 in the vehicle width direction.

The hook terminal lateral cover sections 114 and the hook terminal-side longitudinal wall sections 115 extend forward and rearward along the longitudinal extension sections 71 of the hook-side terminals 70. The hook terminal lateral cover sections 114 and the hook terminal-side longitudinal wall sections 115 extend rearward from the longitudinal extension sections 71 of the hook-side terminals 70.

The hook terminal lateral cover sections 114 and the hook terminal-side longitudinal wall sections 115 extend upward from the longitudinal extension sections 71 of the hook-side terminals 70.

As shown in FIG. 16, the pair of left and right hook terminal lateral cover sections 114 are separated from each other in the vehicle width direction to receive receiving-side cases 120. A separation interval of the pair of left and right hook terminal lateral cover sections 114 in the vehicle width direction has a size equal to or larger than a length of the receiving-side cases 120 in the vehicle width direction.

The pair of left and right hook terminal-side longitudinal wall sections 115 are separated from each other in the vehicle width direction to receive a partition wall 124 of the receiving-side case 120. A separation interval of the pair of left and right hook terminal-side longitudinal wall sections 115 in the vehicle width direction has a size equal to or larger than a width of the partition wall 124 of the receiving-side case 120.

<Front Hook Receiving Section>

In the embodiment, the front hook receiving sections 53 are portions of a front section of the carrier main body 51 that faces the vertical opening sections 51h (see FIG. 7) from above. The front hook receiving sections 53 are portions that receive a load when the storage box 30 is mounted on the carrier 50. As shown in FIG. 15, the front hook receiving sections 53 each have a thickness to enter a vertical gap between a bottom section of the storage box 30 (the box main body 31) and tip portions of the front hooks 33. As shown in FIG. 7, rearward opening sections 53h that opens rearward to receive the rearward extension sections 33b (see FIG. 15) of the front hooks 33 from the front are provided in the front hook receiving sections 53 on the side of the lower surfaces.

<Receiving-Side Terminal>

Figure 17:
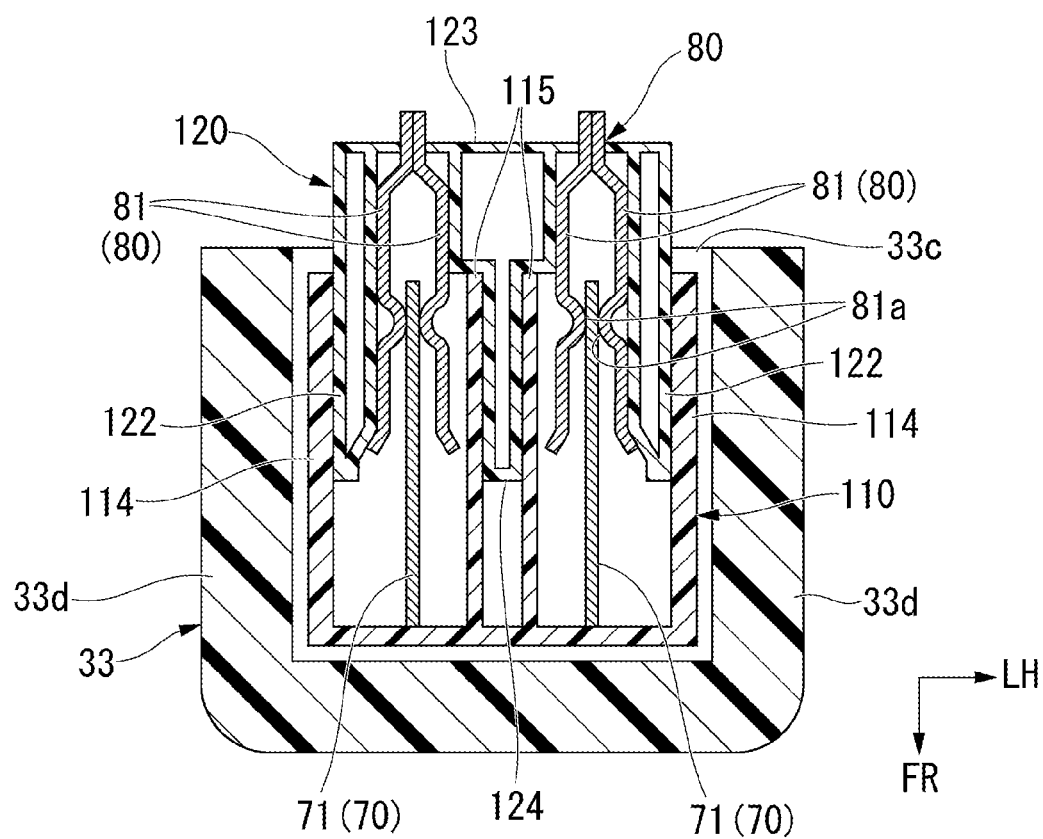
FIG. 17 is a view including a cross section taken along line XVII-XVII in FIG. 16.

As shown in FIG. 15, the receiving-side terminals 80 are provided on the front hook receiving sections 53. As shown in FIG. 16, the receiving-side terminals 80 are provided on the carrier 50 on the side of the lower surface. As shown in FIG. 17, the receiving-side terminals 80 are female terminals. The receiving-side terminals 80 include a pair of terminal pieces 81 that sandwich the hook-side terminals 70. The pair of terminal pieces 81 are provided by one set in each of the accommodating spaces. The pair of terminal pieces 81 face each other in the vehicle width direction.

The pair of terminal pieces 81 extend in the forward/rearward direction. Front end portions of the pair of terminal pieces 81 are inclined to be located outward in the vehicle width direction as they go forward. Accordingly, the hook-side terminals 70 are easily introduced between the pair of terminal pieces 81.

Convex sections 81a protruding toward the hook-side terminals 70 are provided in longitudinal intermediate sections of the pair of terminal pieces 81. When seen in a cross-sectional view of FIG. 17, the convex sections 81a each are formed in an arc shape protruding toward each of the hook-side terminals 70. That is, a contact portion between the hook-side terminals 70 and the convex sections 81a is a contact section between the terminals 70 and 80.

Rear end portions of the pair of terminal pieces 81 are connected to each other. Rear ends of the pair of terminal pieces 81 are located behind a rear end (a receiving terminal rear cover section 123) of the receiving-side case 120. The rear ends of the pair of terminal pieces 81 are connected to a battery (not shown) on the side of the vehicle body via a wiring 85 (see FIG. 14).

<Receiving-Side Case>

Figure 13:
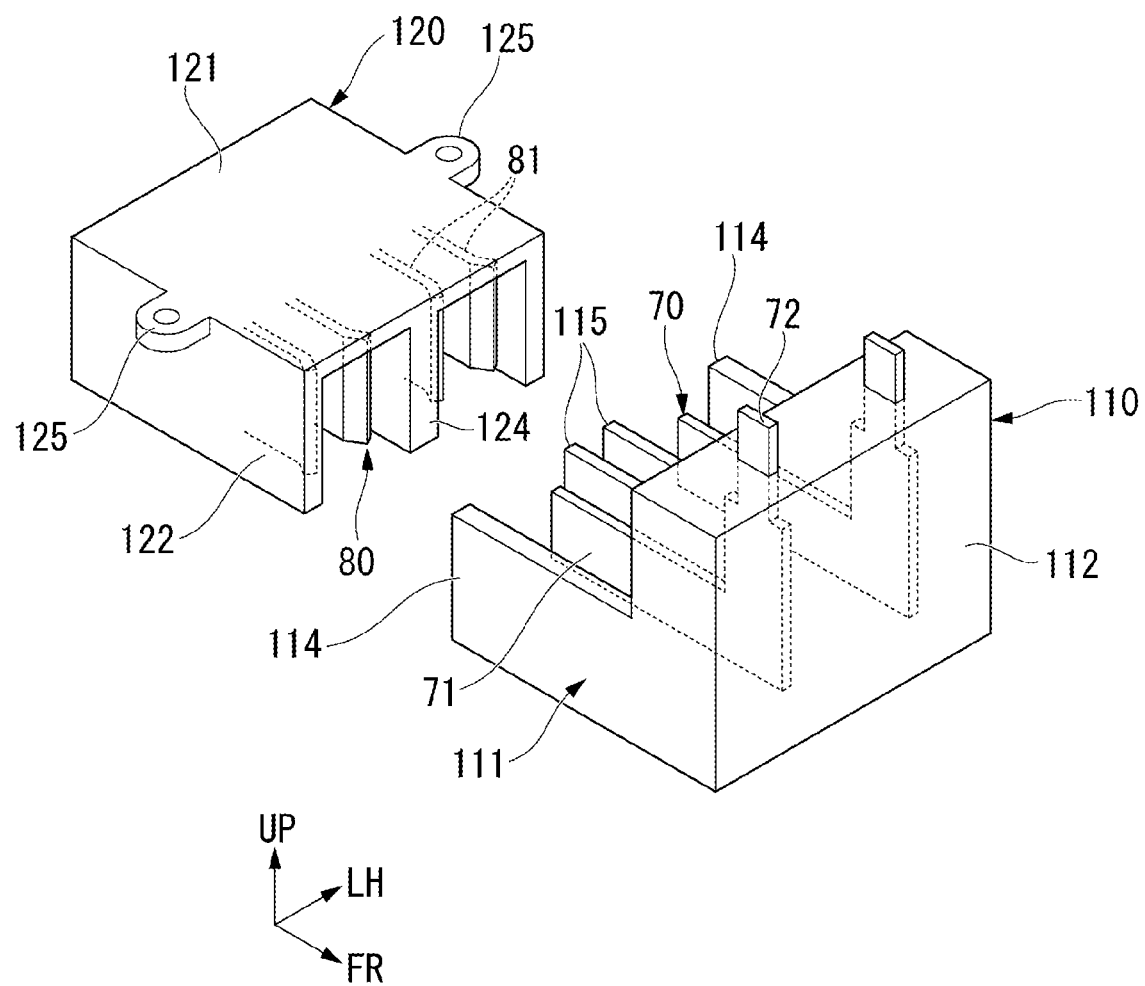
FIG. 13 is a perspective view showing a power supply part (a terminal connecting section) according to the embodiment from above to the right.

As shown in FIG. 16, the receiving-side case 120 configured to surround the receiving-side terminals 80 is provided in the hook receiving section 53. As shown in FIG. 13, the receiving-side case 120 is formed in a box shape that opens forward and downward. As shown in FIG. 16, the receiving-side case 120 is attached to a lower surface of the carrier 50 (a ceiling 51a). That is, the receiving-side case 120 is attached to a lower surface of the front hook receiving section 53. As shown in FIG. 14, the receiving-side case 120 includes a receiving terminal upper cover section 121 configured to cover the receiving-side terminals 80 from above, receiving terminal lateral cover sections 122 configured to cover the receiving-side terminals 80 from an outward side in the vehicle width direction, and the receiving terminal rear cover section 123 configured to cover the receiving-side terminals 80 from behind.

As shown in FIG. 13, the receiving-side case 120 includes the partition wall 124 extending downward from the receiving terminal upper cover section 121, and an outward protrusion section 125 protruding outward from the receiving terminal upper cover section 121 in the vehicle width direction.

The partition wall 124 extends forward and rearward along the receiving terminal lateral cover sections 122. The partition wall 124 divides the accommodating space of the receiving-side terminals 80 in the vehicle width direction.

The outward protrusion section 125 is fixed to the carrier 50 (see FIG. 11) by a fastening member (not shown) such as a bolt or the like.

As shown in FIG. 2, since the storage box 30 is attached to the carrier 50, the receiving-side terminals 80 (see FIG.

15) on the side of the carrier 50 and the hook-side terminals 70 (see FIG. 15) on the side of the storage box 30 are connected to each other. Specifically, as shown in FIG. 17, since the hook receiving sections 53 are connected to the hooks 33 (see FIG. 15), the convex sections 81*a* of the pair of terminal pieces 81 and the hook-side terminals 70 are connected to each other. Accordingly, electric power can be supplied to the electrical component on the side of the lid 32 (the lid lamp 46 shown in FIG. 5) from the battery (not shown) on the side of the vehicle body.

<Lid Member>

As shown in FIG. 8, the storage box power supply structure 25 may further include a lid member 90 detachably provided on the carrier 50 and configured to cover the front hook receiving sections 53 when the storage box 30 (see FIG. 2) is not mounted on the carrier 50.

Figure 18:
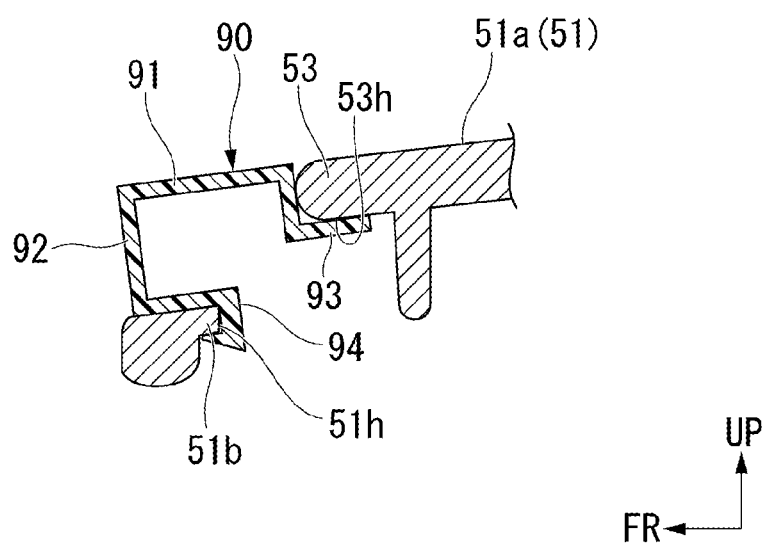
FIG. 18 is a view showing an attachment state of a lid member according to the embodiment and including a cross section corresponding to FIG. 11.

As shown in FIG. 18, the lid member 90 includes an upper wall 91 configured to cover the vertical opening sections 51*h* from above, a front wall 92 configured to cover the rearward opening sections 53*h* from the front, an upper engaging piece 93 continuous with the upper wall 91 and engaged with a front end of the ceiling 51*a* of the carrier main body 51 (lower surfaces of the front hook receiving sections 53), and a front engaging piece 94 continuous with the front wall 92 and engaged with a claw section 51*b* of the carrier main body 51.

<Assembling Procedure of Storage Box>

Hereinafter, an example of a procedure of attaching the storage box 30 to the carrier 50 will be described.

For example, when the storage box 30 is attached to the carrier 50, a procedure of the following (1) to (5) is performed.

(1) First, the handle 42 is lifted, and a key cylinder 41 is exposed to the outside.

(2) Next, a key is inserted into the key cylinder 41 and pivoted clockwise, and locking of the box main body 31 is released.

(3) Next, the storage box 30 is mounted on the carrier 50.

Figure 19:
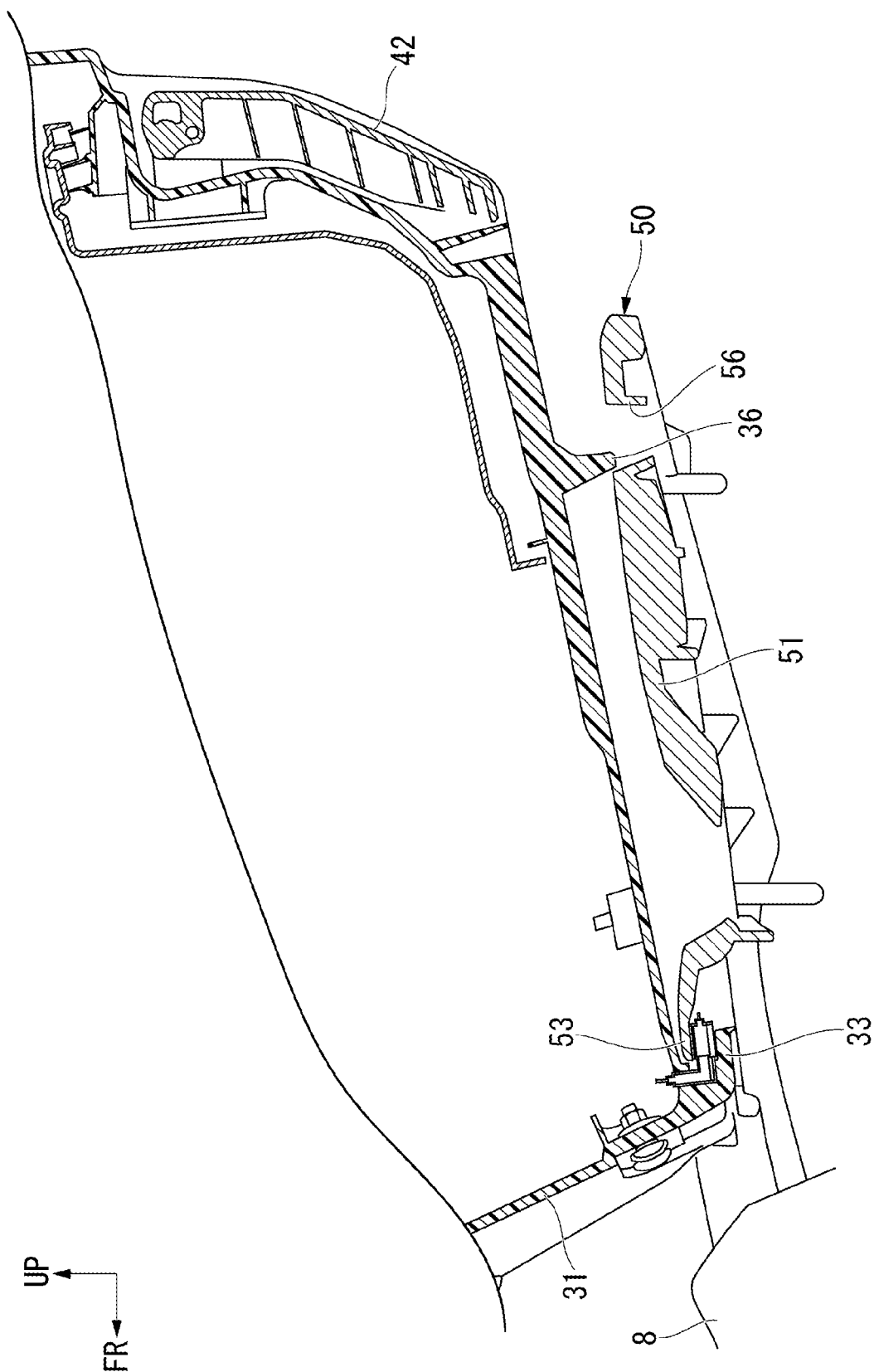
FIG. 19 is a view showing a process of an assembling procedure of the storage box according to the embodiment and including a cross section corresponding to FIG. 12.

Specifically, as shown in FIG. 19, the front hooks 33 are pushed into the front hook receiving sections 53 to be positioned. After that, the rear hook 34 is pushed into the rear hook receiving section 54 (see FIG. 10).

(4) Next, the key is pivoted counterclockwise and the box main body 31 is locked, and then, the key is removed.

(5) Next, the handle 42 is received in the U-shaped groove 31*u*.

According to the above-mentioned procedure, the storage box 30 can be attached to the carrier 50.

<Removal Procedure of Storage Box>

Hereinafter, an example of a procedure of removing the storage box 30 from the carrier 50 will be described.

For example, when the storage box 30 is removed from the carrier 50, a procedure of the following (1) to (5) is performed.

(1) First, the handle 42 is lifted, and a box main body unlocking button 40 and the key cylinder 41 are exposed to the outside.

(2) Next, the key is inserted into the key cylinder 41 and pivoted clockwise, and locking of the box main body 31 is released.

(3) Next, the box main body unlocking button 40 is pushed, and the storage box 30 is removed from the carrier 50.

(4) Next, the key is pivoted counterclockwise and the box main body 31 is locked, and then, the key is removed.

(5) Next, the handle 42 is received in the U-shaped groove 31*u*.

According to the above-mentioned procedure, the storage box 30 can be removed from the carrier 50.

As described above, the storage box power supply structure 25 of the embodiment includes the storage box 30, the carrier 50 configured to detachably mount the storage box 30 on the vehicle body, the hooks 33 configured to connect the storage box 30 to the carrier 50, the hook receiving sections 53 configured to receive the hooks 33, the hook-side terminals 70 provided inside the hooks 33 and configured to supply electric power to the lid lamp 46, and the receiving-side terminals 80 provided in the hook receiving sections 53 and connected to the hook-side terminals 70 when the storage box 30 is mounted on the carrier 50.

According to the configuration, since the hook-side terminals 70 provided inside the hooks 33 and configured to supply electric power to the lid lamp 46 and the receiving-side terminals 80 provided in the hook receiving sections 53 and connected to the hook-side terminals 70 when the storage box 30 is mounted on the carrier 50 are provided, the following effects are exhibited. Since the hooks 33 are hooked in the hook receiving sections 53, the terminals 70 and 80 can be supported with rigidity. In addition, since the power supply structure is provided inside the hooks 33, there is no need to provide a new power supply part in the bottom section of the storage box 30, and there is no need to significantly change shapes of the storage box 30 and the carrier 50. Accordingly, it is possible to provide a power supply part on an area having resistance to vibrations and high rigidity as a power supply structure using a conventional structure without providing a new power supply part in the storage box 30.

In addition, self-cleaning of the terminals 70 and 80 can be performed by friction when the hooks 33 are attached to the hook receiving sections 53. In addition, oxide films of the terminals 70 and 80 can be removed, or foreign substances such as attritional grit or the like can be removed.

In addition, since the hook-side terminals 70 are provided inside the hooks 33, the hook-side terminals 70 are less likely to be exposed to the outside. Accordingly, since foreign substances such as dust or the like are less likely to be adhered to the hook-side terminals 70, contact reliability of the terminals 70 and 80 can be maintained.

In addition, in the embodiment, since the hooks 33 include the rearward extension sections 33*b* with which the hook-side terminals 70 are provided integrally and extending in the forward/rearward direction, the following effects are exhibited. When the hooks 33 are attached to the hook receiving sections 53, a sliding operation of the rearward extension sections 33*b* in the forward/rearward direction can be applied. Accordingly, attritional grit in a contact section can be prevented while connection to the terminals 70 and 80 is stabilized.

In addition, in the embodiment, since the rearward extension sections 33*b* includes the longitudinal wall sections 33*d* protruding upward from the hook-side terminals 70 and abutting the lower surface of the carrier 50 when the storage box 30 is mounted on the carrier 50, the following effects are exhibited. Since the upper ends of the longitudinal wall sections 33*d* and the lower surface of the carrier 50 function as a load receiving section, it is possible to prevent a load from being applied to the power supply part.

In addition, in the embodiment, since the hook-side terminals 70 are male terminals and parts of the hook-side terminals 70 are formed in plate shapes extending in the extending direction of the rearward extension sections 33*b*, flexibility in the vehicle width direction can be absorbed by the hook-side terminals 70. Accordingly, the power supply part can be provided in an area having resistance to vibrations while variations of the terminals 70 and 80 at a connecting position are absorbed.

In addition, when the hooks 33 are attached to the hook receiving sections 53, a sliding operation of the hook-side terminals 70 in the forward/rearward direction can be applied. Accordingly, attritional grit in the contact section can be prevented while connection to the terminals 70 and 80 is stabilized.

In addition, in the embodiment, since the tips 70*t* of the hook-side terminals 70 are located inside the tips 33*t* of the hooks 33, the hook-side terminals 70 and the receiving-side terminals 80 are connected after the hooks 33 and the hook receiving sections 53 are positioned. Accordingly, when the terminal on the side of the storage box 30 and the terminal on the side of the carrier 50 are connected, positioning of the terminal can be easily performed.

In addition, in the embodiment, since the hook-side case 110 configured to cover the hook-side terminals 70 is provided inside the hooks 33 and the longitudinal length L2 of the hook-side terminals 70 is smaller than the longitudinal length L1 of the hook-side case 110, the hook-side terminals 70 and the receiving-side terminals 80 are connected after the hook-side case 110 is positioned. Accordingly, when the terminal on the side of the storage box 30 and the terminal on the side of the carrier 50 are connected, positioning of the terminal can be easily performed.

In addition, in the embodiment, since the receiving-side terminals 80 are located on the carrier 50 on the side of the lower surface, the receiving-side terminals 80 can be supported with rigidity.

In addition, in the embodiment, since the receiving-side terminals 80 are female terminals and include the pair of terminal pieces 81 that sandwiches the hook-side terminals 70, the following effects are exhibited. In comparison with the case in which the receiving-side terminals 80 include only one terminal piece 81, connection between the hook-side terminals 70 and the receiving-side terminals 80 can be reliably performed.

In addition, in the embodiment, since the pair of terminal pieces 81 face each other in the vehicle width direction, flexibility in the upward/downward direction can be absorbed by the pair of terminal pieces 81. Accordingly, it is possible to provide the power supply part on the area having resistance to vibrations while variations of the terminals 70 and 80 at the connecting position are absorbed.

In addition, in the embodiment, since the receiving-side case 120 surrounding the receiving-side terminals 80 and formed in a box shape that opens downward is provided on the hook receiving sections 53, the receiving-side terminals 80 cannot be easily exposed to the outside by the receiving-side case 120.

In addition, in the embodiment, since the rearward opening sections 53*h* that open rearward such that the rearward extension sections 33*b* of the hooks 33 are received from the front are formed in the hook receiving sections 53 on the side of the lower surface, the following effects are exhibited. In comparison with the case in which the hooks 33 can be received in the hook receiving sections 53 from the rear, approaching of the hooks 33 with respect to the hook receiving sections 53 can be easily performed. For example, when the carrier 50 is a rear carrier 50 provided in the rear section of the vehicle body, the storage box 30 can be easily mounted on the rear carrier 50.

In addition, in the embodiment, since the vertical opening sections 51*h* that open upward and downward in the vicinity of the hook receiving sections 53 are provided in the carrier 50, water removal through the openings of the vertical opening sections 51*h* can be performed. For example, even though the storage box 30 is mounted on the carrier 50 when it's raining, rain water or the like can be prevented from entering the hook receiving sections 53.

In addition, in the embodiment, when the lid member 90 detachably provided on the carrier 50 and configured to cover the hook receiving sections 53 when the storage box 30 is not mounted on the carrier 50 is further provided, the hook receiving sections 53 are not exposed to the outside by the lid member 90. Accordingly, when the storage box 30 is not mounted on the carrier 50, it is possible to prevent foreign substances such as water, dust, and the like, from entering the hook receiving sections 53.

In addition, in the embodiment, since the pair of the hooks 33 are provided on left and right sides, the following effects are exhibited. Since the storage box 30 and the carrier 50 are connected with good lateral balance, in comparison with the case in which only one hook 33 is provided, the power supply part can be provided in the area having more resistance to vibrations.

Further, in the embodiment, while an exemplary example in which the storage box 30 is provided in the rear section of the vehicle has been described, there is no limitation thereto. For example, the storage box 30 may be provided in the front section of the vehicle or may be provided on a side portion of the vehicle (a side portion of the carrier 50).

In addition, in the embodiment, while an exemplary example in which the front hooks 33 each have an L shape that extends downward from the front lower section of the box main body 31 and then extends to be bent rearward has been described, there is no limitation thereto. For example, the front hooks 33 each may have an L shape that extends downward from the front lower section of the box main body 31 and then extends to be bent rearward.

In addition, in the embodiment, while an exemplary example in which the hook-side terminals 70 are provided inside the front hooks 33 has been described, there is no limitation thereto. For example, the hook-side terminals 70 may be provided inside the rear hook 34.

In addition, in the embodiment, while an exemplary example in which the hook-side terminals 70 are provided on the left and right front hooks 33, respectively, has been described, there is no limitation thereto. For example, the hook-side terminals 70 may be formed on only one of the left and right front hooks 33. That is, the hook-side terminals 70 may be provided on at least one of the left and right front hooks 33.

In addition, in the embodiment, while an exemplary example in which the pair of left and right front hooks 33 are provided has been described, there is no limitation thereto. For example, only one front hook 33 may be provided or a plurality of (three or more) front forks may be provided.

In addition, in the embodiment, while an exemplary case in which the outward protrusion section 125 of the front hook receiving section 53 is fixed to the carrier 50 by a fastening member (not shown) such as a bolt or the like has been described, there is no limitation thereto. For example, the front hook receiving sections 53 are formed integrally with the carrier 50.

In addition, in the embodiment, while an exemplary example in which parts of the hook-side terminals 70 are formed in plate shapes extending in the extending direction of the rearward extension sections 33*b* has been described, there is no limitation thereto. For example, all of the hook-side terminals 70 may be formed in a plate shape extending in the extending direction of the rearward extension sections 33b. That is, at least part of the hook-side terminals 70 may be formed in a plate shape extending in the extending direction of the rearward extension sections 33b.

Figure 20:
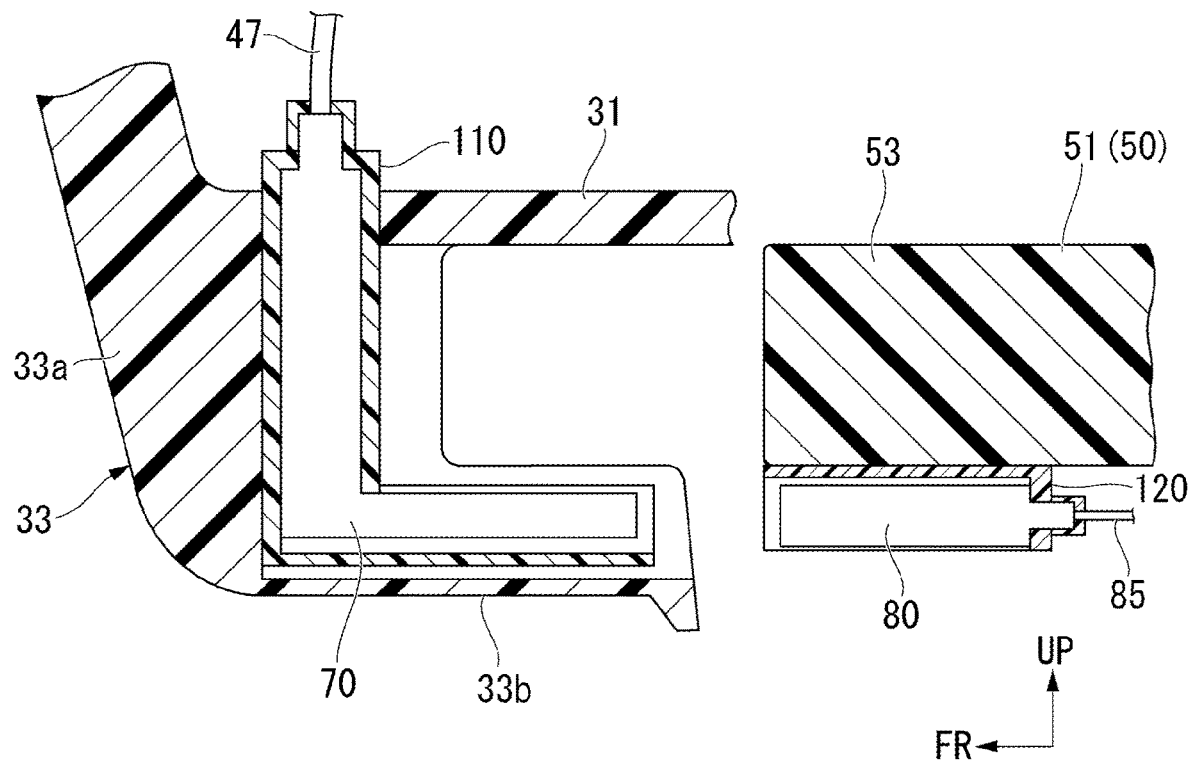
FIG. 20 is a view showing a power supply part (a terminal connecting section) according to a first variant of the embodiment and including a cross section corresponding to FIG. 15.

In addition, in the embodiment, while an exemplary example in which the hook-side case 110 is attached to the front hooks 33 via the seal member 69 has been described, there is no limitation thereto. For example, as shown in FIG. 20, the hook-side case 110 may be directly fixed to the front hooks 33.

Figure 21:
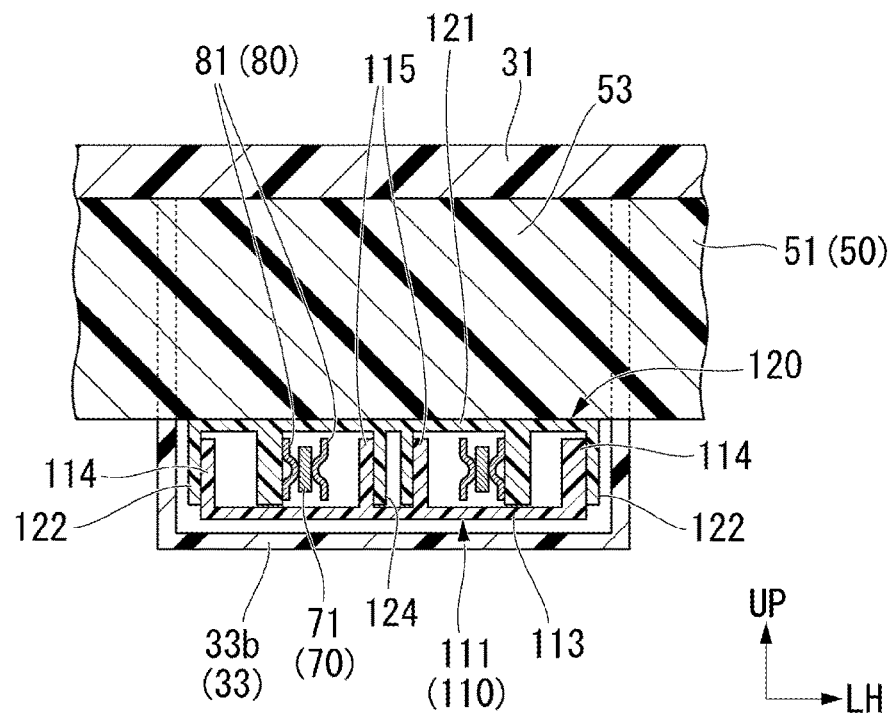
FIG. 21 is a view showing a connection state of the power supply part (the terminal connecting section) according to the first variant of the embodiment and including a cross section corresponding to FIG. 16.

In addition, in the embodiment, while an exemplary example in which the pair of left and right hook terminal lateral cover sections 114 are separated from each other in the vehicle width direction such that they can receive the receiving-side cases 120, there is no limitation thereto. For example, as shown in FIG. 21, the pair of left and right hook terminal lateral cover sections 114 may have sizes that go between the receiving-side cases 120 in the vehicle width direction. That is, a separation interval between the pair of left and right receiving terminal lateral cover sections 122 in the vehicle width direction ma have a size larger than a length of the hook-side case 110 in the vehicle width direction.

Figure 22:
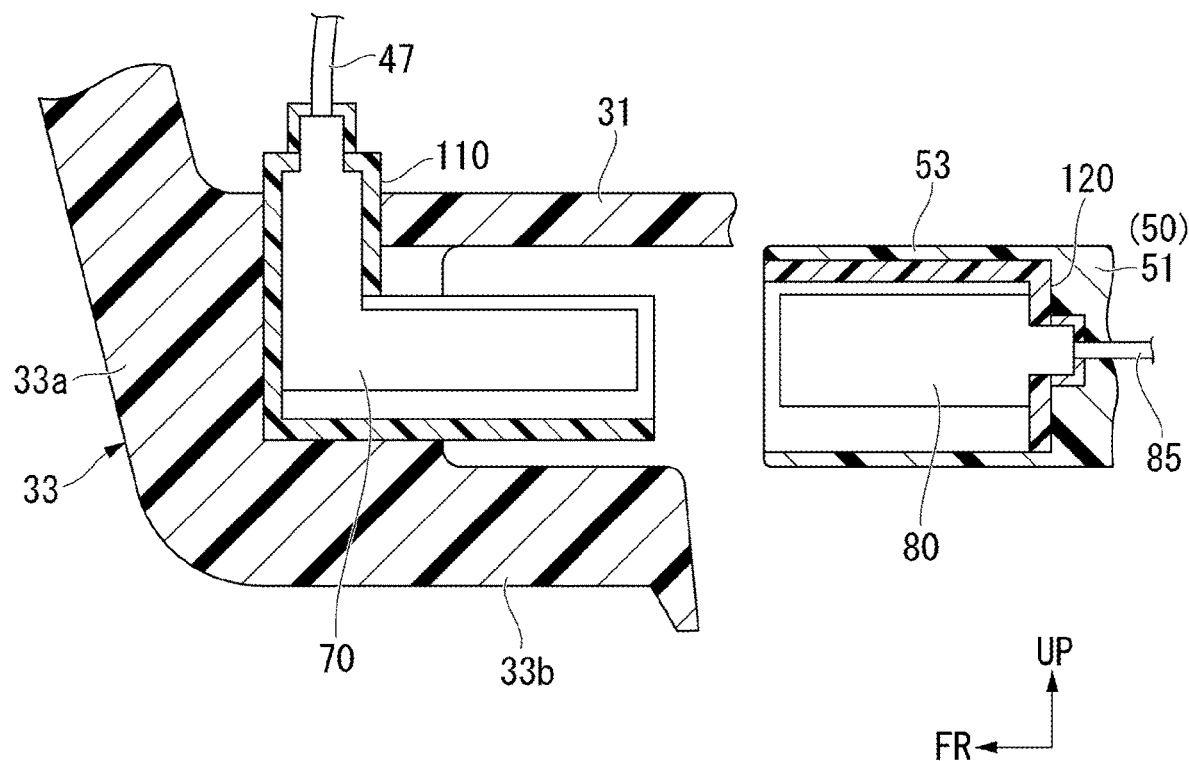
FIG. 22 is a view showing a power supply part (a terminal connecting section) according to a second variant of the embodiment and including a cross section corresponding to FIG. 15.
Figure 23:
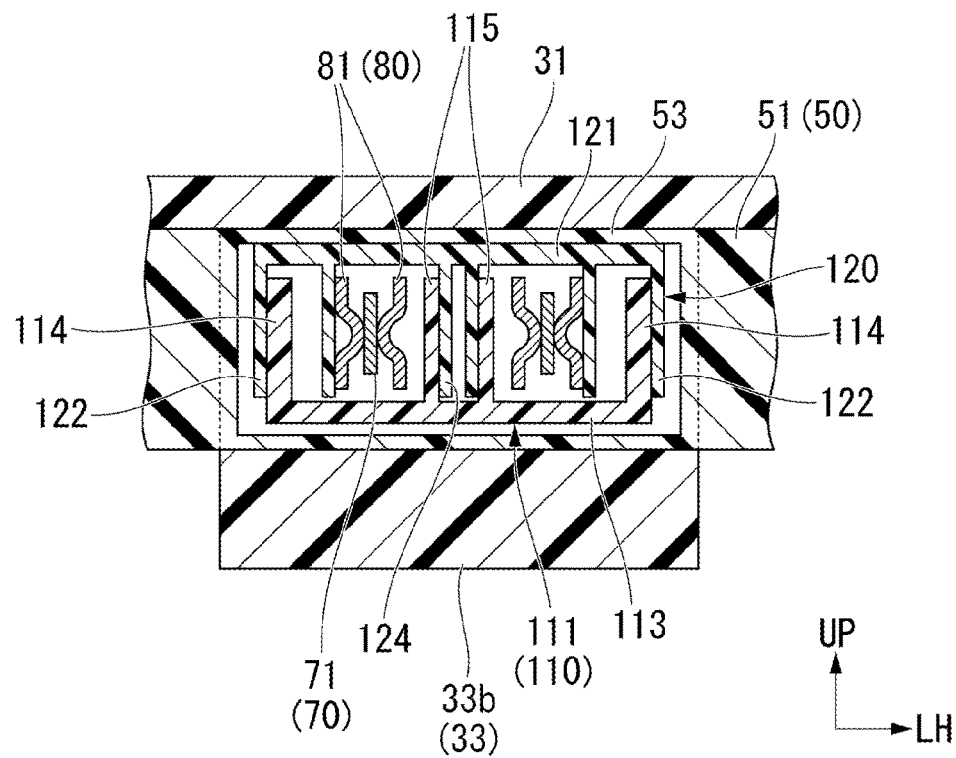
FIG. 23 is a view showing a connection state of the power supply part (the terminal connecting section) according to the second variant of the embodiment and including a cross section corresponding to FIG. 16.

In addition, in the embodiment, while an exemplary example in which the receiving-side cases 120 are attached to the lower surfaces of the front hook receiving sections 53 has been described, there is no limitation thereto. For example, as shown in FIG. 22, the receiving-side cases 120 may be installed in the front hook receiving sections 53. For example, as shown in FIG. 23, in a structure in which the receiving-side cases 120 are installed in the front hook receiving sections 53, the pair of left and right hook terminal lateral cover sections 114 may have sizes that go between the receiving-side cases 120 in the vehicle width direction.

Figure 24:
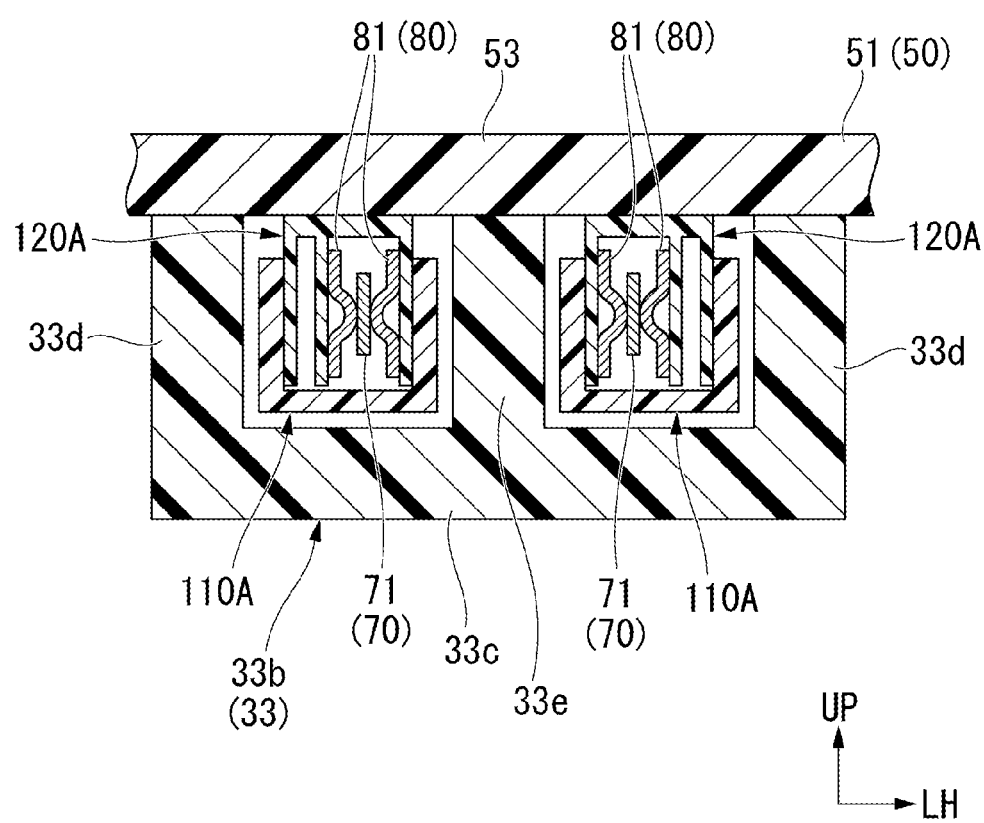
FIG. 24 is a view showing a connection state of a power supply part (a terminal connecting section) according to a third variant of the embodiment and including a cross section corresponding to FIG. 16.

In addition, in the embodiment, while an exemplary example in which a configuration including the receiving-side case 120 that surrounds the two receiving-side terminals 80 (two sets of pairs of terminal pieces 81) has been described, there is no limitation thereto. For example, as shown in FIG. 24, a configuration including two receiving-side cases 120A that surround the receiving-side terminal 80 (a set of pair of terminal pieces 81) may be provided.

In addition, in the embodiment, while an exemplary example in which the front hooks 33 include the lower wall sections 33c configured to cover the hook-side terminals 70 from below, and the longitudinal wall sections 33d configured to cover the left and right hook-side terminals 70 from an outward side in the vehicle width direction has been described, there is no limitation thereto. For example, as shown in FIG. 24, in the configuration including the two receiving-side cases 120A, the front hooks 33 may further include second longitudinal wall sections 33e configured to divide the accommodating space of the receiving-side terminals 80 in the vehicle width direction. The second longitudinal wall sections 33e may abut the lower surface of the carrier 50 together with the left and right longitudinal wall sections 33d when the storage box 30 is mounted on the carrier 50. In FIG. 24, reference sign 110A designates a hook-side case corresponding to each of the receiving-side cases 120.

Figure 25:
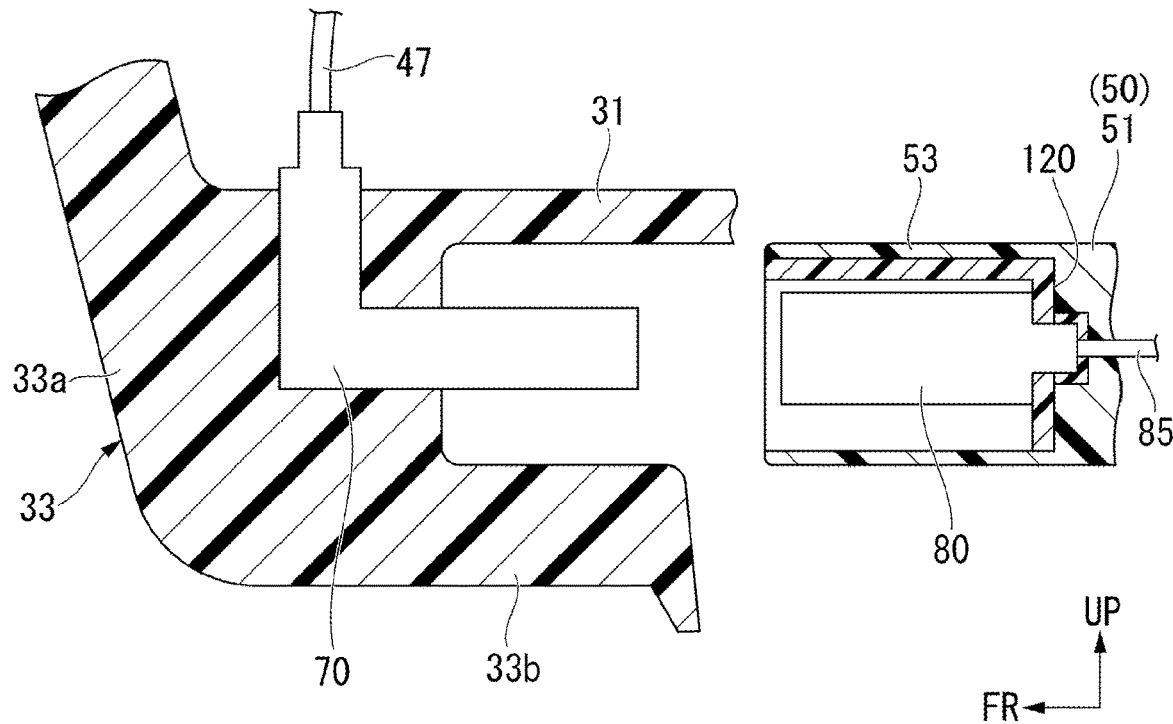
FIG. 25 is a view showing a power supply part (a terminal connecting section) according to a fourth variant of the embodiment and including a cross section corresponding to FIG. 15.

In addition, in the embodiment, while an exemplary example in which the hook-side terminals 70 are attached to the front hooks 33 via the hook-side case 110 has been described, there is no limitation thereto. For example, as shown in FIG. 25, the hook-side terminals 70 may be directly attached to the front hooks 33. That is, the hook-side case 110 may be provided inside the front hooks 33.

Figure 26:
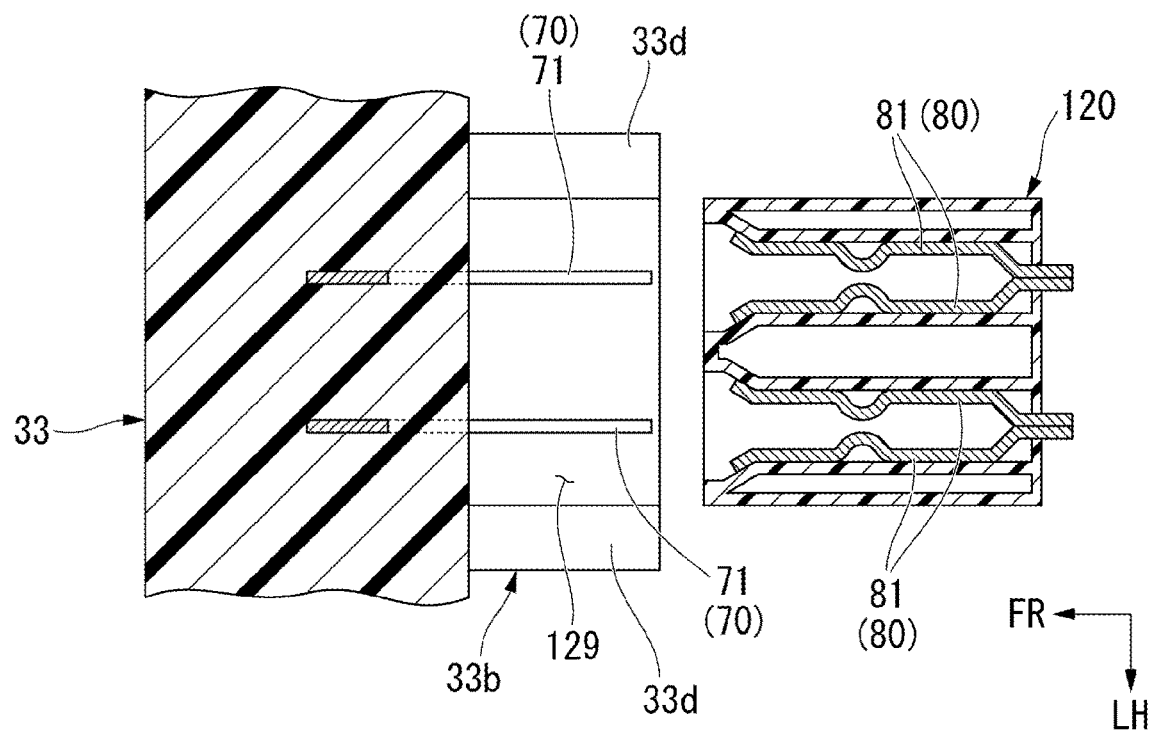
FIG. 26 is a view showing the power supply part (the terminal connecting section) according to the fourth variant of the embodiment and including a cross section corresponding to FIG. 17.

In addition, in the embodiment, while an exemplary case in which the spaces configured to accommodate the longitudinal extension case sections 111 in the hook-side case 110 are provided in the rearward extension sections 33b of the front hooks 33 has been described, there is no limitation thereto. For example, as shown in FIG. 26, a space 129 configured to accommodate a portion of the front hook receiving section 53 (see FIG. 25) containing the receiving-side case 120 is provided in the rearward extension section 33b of the front hook 33.

In addition, in the embodiment, while the lid lamp 46 has been described as an exemplary example of the electrical component, there is no limitation thereto. For example, the electrical component may be another electrical component such as a USB charger, a solenoid, and the like, and may be other lighting devices than the lid lamp 46.

In addition, the present invention is not limited to the embodiment, and for example, all vehicles on which a driver rides on the vehicle body are included as the saddles vehicle, and in addition to a motorcycle (including a motorized bicycle and a scooter-type vehicle), a three-wheeled vehicle (including a two-front-wheeled and one-rear-wheeled vehicle in addition to one-front-wheeled and two-rear-wheeled vehicle) is also included. In addition, the present invention may also be applicable to a four-wheeled vehicle such as an automobile or the like, in addition to the motorcycle.

Then, the configuration of the embodiment is an example of the present invention, and various modifications may be made without departing from the spirit of the present invention, for example, substitution of the components of the embodiment with known components, or the like.

BRIEF DESCRIPTION OF THE REFERENCE SYMBOLS

1 Motorcycle (saddled vehicle)
25 Storage box power supply structure
30 Storage box
33 Front hook (hook)
33a Downward extension section
33b Rearward extension section (longitudinal extension section)
33d Longitudinal wall section
33t Tip of front hook (hook)
46 Lid lamp (electrical component)
50 Carrier
51h Vertical opening section
53 Front hook receiving section (hook receiving section)
53h Rearward opening section
70 Hook-side terminal
70t Tip of hook-side terminal
71 Longitudinal extension section
80 Receiving-side terminal
81 Terminal piece
90 Lid member
110, 110A Hook-side case
120, 120A Receiving-side case
L1 Longitudinal length of hook-side case
L2 Longitudinal length of hook-side terminal

The invention claimed is:
1. A storage box power supply structure for a saddled vehicle, comprising:
a storage box;
a carrier configured to detachably mount the storage box on a vehicle body;

a hook configured to connect the storage box to the carrier;

a hook receiving section configured to receive the hook;

a hook-side terminal provided inside the hook and configured to supply electric power to an electrical component; and a receiving-side terminal provided in the hook receiving section and connected to the hook-side terminal when the storage box is mounted on the carrier, wherein the receiving-side terminal is disposed on the carrier on the side of the lower surface, wherein the hook comprises a downward extension section extending downward from a lower section of the storage box;

a longitudinal extension section integrally provided with the hook-side terminal and extending rearward from a lower end of the downward extension section; and a longitudinal wall section vertically extending toward above the hook-side terminal and configured to abut a lower surface of the carrier when the storage box is mounted on the carrier.

2. The storage box power supply structure for a saddled vehicle according to claim 1, wherein the hook-side terminal is a male terminal, and at least a part of the hook-side terminal is formed in a plate shape extending in an extending direction of the longitudinal extension section.

3. The storage box power supply structure for a saddled vehicle according to claim 1, wherein a tip of the hook-side terminal is disposed further inward than a tip of the hook.

4. The storage box power supply structure for a saddled vehicle according to claim 1, wherein a hook-side case that surrounds the hook-side terminal is provided inside the hook, and a longitudinal length of the hook-side terminal is smaller than a longitudinal length of the hook-side case.

5. The storage box power supply structure for a saddled vehicle according to claim 1, wherein the receiving-side terminal is a female terminal and comprises a pair of terminal pieces that sandwiches the hook-side terminal.

6. The storage box power supply structure for a saddled vehicle according to claim 5, wherein the pair of terminal pieces face each other in a vehicle width direction.

7. The storage box power supply structure for a saddled vehicle according to claim 1, wherein a receiving-side case surrounding the receiving-side terminal and formed in a box shape that opens downward is provided in the hook receiving section.

8. The storage box power supply structure for a saddled vehicle according to claim 7, wherein the hook comprises:

a rearward opening section that opens rearward to receive the longitudinal extension section from the front is formed in the hook receiving section on the side of the lower surface.

9. The storage box power supply structure for a saddled vehicle according to claim 1, wherein a vertical opening section that opens upward and downward in the vicinity of the hook receiving section is formed in the carrier.

10. The storage box power supply structure for a saddled vehicle according to claim 1, further comprising a lid member detachably provided on the carrier and configured to cover the hook receiving section when the storage box is not mounted on the carrier.

11. The storage box power supply structure for a saddled vehicle according to claim 1, wherein a pair of hooks are provided on left and right sides.

* * * * *